United States Patent [19]
Gotoh et al.

[11] Patent Number: 5,182,075
[45] Date of Patent: Jan. 26, 1993

[54] NUCLEAR FUSION REACTOR

[75] Inventors: Yoshitaka Gotoh, Katsuta; Shigeru Kikuchi; Tetsuo Nakazawa, both of Ibaraki; Tadahiko Miyoshi, Hitachi; Tetsuo Oyama, Takahagi; Yoshihiro Ozawa, Mito; Shin-ichi Itoh, Kawasaki, all of Japan

[73] Assignee: Hitachi, Ltd., Tokyo, Japan

[21] Appl. No.: 523,403

[22] Filed: May 15, 1990

[30] Foreign Application Priority Data

May 24, 1989 [JP] Japan .................. 1-128836

[51] Int. Cl.⁵ .............................. G21B 1/00
[52] U.S. Cl. ...................... 376/150; 376/136
[58] Field of Search ............. 376/150, 136, 100, 134

[56] References Cited

U.S. PATENT DOCUMENTS

| | | | |
|---|---|---|---|
| 4,555,275 | 11/1985 | Tobin | 376/150 |
| 4,690,793 | 9/1987 | Hitachi et al. | 376/150 |
| 4,696,781 | 9/1987 | Bourque | 376/150 |

FOREIGN PATENT DOCUMENTS

| | | | |
|---|---|---|---|
| 115983 | 9/1981 | Japan . | |
| 151084 | 8/1984 | Japan . | |
| 208488 | 11/1984 | Japan | 376/136 |
| 100085 | 6/1985 | Japan | 376/136 |
| 188873 | 9/1985 | Japan | 376/136 |
| 99667 | 5/1986 | Japan . | |
| 104064 | 5/1986 | Japan . | |
| 240773 | 10/1987 | Japan . | |
| 151893 | 6/1988 | Japan | 376/136 |
| 1-96590 | 4/1989 | Japan | 376/134 |
| 98990 | 4/1989 | Japan | 376/136 |

Primary Examiner—Daniel D. Wasil
Attorney, Agent, or Firm—Antonelli, Terry, Stout & Kraus

[57] ABSTRACT

A structure of a nuclear fusion reactor having a vacuum vessel in which hydrogen isotope plasma is enclosed and a confining magnetic field generating coil for confining said plasma at a predetermined position in said vacuum vessel. It comprises a low tritium-permeable layer having lower tritium-permeability than that of a cooling metal base for forming a refrigerant passage for cooling the vacuum vessel on at least the surface adjacent to said plasma enclosed and a heat resistant and insulating fire member of the level higher than that of said cooling metal base for thermally shielding said low tritium-permeable layer from said plasma or corpuscular rays is formed on the low tritium-permeable layer. The similar processings are applied to the cooling metal base for forming the refrigerant passage for cooling a divertor disposed in the vacuum vessel and for neutralizing ionized corpuscles so as to exhaust them.

32 Claims, 10 Drawing Sheets

NUCLEAR FUSION REACTOR

BACKGROUND OF THE PRESENT INVENTION

The present invention relates to a novel nuclear fusion reactor, and, more particularly, to a nuclear fusion reactor which comprises a forcibly-cooled type reactor wall having low tritium permeability and which uses hydrogen isotope fuel, the forcibly-cooled type reactor wall being positioned to confront plasma or corpuscular rays.

As disclosed in Japanese Patent Unexamined Publication No. 61-104064, a conventional nuclear fusion reactor has been constituted such that a low tritium-permeable layer is formed on the surface of a cooling metal base of a nuclear fusion reactor wall confronting hydrogen isotope plasma for the purpose of preventing the penetration of tritium. The thus formed low tritium-permeably layer has been directly exposed to plasma corpuscles. A metal layer formed on the surface of the cooling metal base provided for the same purpose and having a large recombination constant of the hydrogen isotope has also been exposed to plasma corpuscles as disclosed in Japanese Patent Unexamined Publication No. 62-240773.

As disclosed in Japanese Patent Unexamined Publication Nos. 61-99667 and 56-115983, a structure has constituted such that the tritium penetration preventive layer is formed on the surface of the cooling metal base adjacent to the cooling medium so that the low tritium-permeable layer is not exposed to the plasma corpuscles. According to a structure of the type described above, the cooling metal base is directly exposed to plasma corpuscles. Therefore, a problem takes place in that the soundness of the water cooling metal base deteriorates such that the surface can be fused, and hydrogen embrittlement can take place. On the other hand, a structure disclosed in Japanese Patent Unexamined Publication No. 59-151084 and arranged such that the cooling metal base is covered with a member made of a high fusing point heat resistant material such as SiC so as to be protected from plasma has been constituted such that no penetration-preventive layer is provided between the heat resistant member and the passage through which the cooling medium passes through. Furthermore, the portion of the cooling metal base covered with no heat resistant member has no low tritium permeable layer formed thereon.

According to the above-described conventional structures, the low tritium-permeable layer formed on the surface of the cooling metal base exposed to the plasma for the purpose of preventing the penetration of tritium is subjected to sputtering of hydrogen isotope or impure corpuscles emitted from the reactor core. Furthermore, the surface layer of the base is fused due to a heat load, causing the applied layer to be broken. Furthermore, another problem arises in that the diffusional speed of the hydrogen isotope is raised excessively due to the rise of the temperature of the low-tritium penetration preventive layer and the quantity of the tritium penetration is thereby enlarged excessively. In this case where the tritium penetration preventive layer is provided on only the surface of the cooling metal base adjacent to the passage through which the cooling medium passes, hydrogen isotopes made incident upon the surface of the metal base confronting the plasma can be easily diffused and dissolved in the metal base. The thus diffused and dissolved hydrogen isotope segregates in the grain boundary, causing an intergranular fracture to occur. Therefore, a problem takes place in the structural reliability. According to the above-described conventional structures, atoms existing in the outer layer of the cooling base are forcibly ejected or the atoms existing in the outer layer of the same are evaporated due to the collision of plasma corpuscles. As a result, a problem arises in that the temperature of the plasma is lowered since the radiant energy loss effect can be raised due to the introduction of the evaporated atoms from the surface layer into the reactor core plasma.

According to the structure arranged such that the heat resistant member is disposed on the surface of the cooling metal base exposed to the plasma so as to prevent the direct incidence of the plasma corpuscles into the surface of the metal base, hydrogen isotopic molecules or hydrogen isotopes in the form of atoms are dissolved into the base through the surface of the cooling metal base. The thus dissolved hydrogen isotopic molecules or hydrogen isotopes in the form of atoms are easily diffused in the cooling base and penetrate the same, causing a problem in that the hydrogen isotopic molecules or hydrogen isotopes in the form of atoms leak in the cooling medium.

Furthermore, since the solubility of hydrogen isotopes in copper or stainless steel used as material for the cooling metal base rises proportionally to elevation degree of the temperature, a heating method used as means for promoting the redischarge and removal of the hydrogen isotopes which has been temporarily dissolved in the cooling metal cannot overcome the above-described problem. Therefore, in the case where the structure has no low tritium permeable layer for preventing the dissolution of the hydrogen isotopes in the cooling metal base and in the structural material for a vacuum container wall, the quantity of the hydrogen isotope dissolved in the cooling metal base and in the structural material for a vacuum vessel wall is increased during the operation of the reactor core for a long time. As a result, a maintenance and operational problem arises in that the dissolved hydrogen isotopes cannot be easily removed.

SUMMARY OF THE INVENTION

An object of the present invention is to provide a nuclear fusion reactor, a divertor therefor and a reactor core wall of a vacuum vessel therefor capable of preventing the dissolution and the penetration of hydrogen isotope fuel corpuscles for use in a reactor core into the vacuum vessel wall and a cooling metal base so that the leaking of the same into the cooling medium is prevented, of preventing the deterioration of the structural soundness of the cooling metal base due to the hydrogen embrittlement, of preventing the dissolution of the fuel corpuscles into the vacuum vessel and the cooling metal base so as to reduce the quantity of the loss of the fuel corpuscles, and of reducing the quantity of the impurity atoms mixed from the reactor core wall to the reactor core plasma.

In order to achieve the above-described objects, according to a first aspect of the present invention there is provided a nuclear fusion reactor having a vacuum vessel in which hydrogen isotope plasma is enclosed, a confining magnetic field generating coil for confining the plasma at a predetermined position in the vacuum vessel and a cooling metal base for forming a refrigerant passage for cooling the vacuum vessel, the nuclear fusion reactor comprising: a low tritium-permeable layer having lower tritium permeability than that of the cooling metal base and formed on the surface of the cooling metal base on at least the surface adjacent to the plasma enclosed; and a heat resistant and insulating fire member of the level higher than that of the cooling metal base for thermally shielding the low tritium-permeable layer from the plasma or corpuscular rays, the heat resistant and insulating fire member being formed on the low tritium-permeable layer.

According to a second aspect of the present invention, there is provided a nuclear fusion reactor having a divertor for neutralizing ionized corpuscles so as to exhaust them, the nuclear fusion reactor comprising: a low tritium-permeable layer having lower tritium permeability than that of a cooling metal base forming a refrigerant passage for cooling the divertor and formed on at least the surface, being confronted with the plasma, of the cooling metal base; and a heat resistant and insulating fire member of the level higher than that of the cooling metal base for thermally shielding the low tritium-permeable layer from the plasma or corpuscular rays, the heat resistant and insulating fire member being formed such that it covers the low tritium-permeable layer.

According to a third aspect of the present invention, there is provided a nuclear fusion reactor having a divertor comprising: a cooling metal base for forming the refrigerant passage for cooling the divertor and a heat resistant and insulating fire member surrounding the cooling metal base, the level of heat resistance and fire insulation being higher than that of the cooling metal base, wherein the divertor is positioned in contact with a cooling metal base forming the vacuum vessel and fixed at the position.

According to a fourth aspect of the present invention, there is provided a nuclear fusion reactor having a cooling metal base for forming a refrigerant passage for cooling the vacuum vessel and a divertor disposed in the vacuum vessel and neutralizing ionized corpuscles so as to exhaust them, wherein the divertor has a cooling metal base for forming the refrigerant passage for cooling the divertor and a heat resistant and insulating fire member surrounding the latter cooling metal base, the level of heat resistance and fire insulation of the heat resistant and insulating fire member being higher than that of the latter cooling metal base, and the both cooling metal bases has a low tritium-permeable layer having lower tritium permeability than those of the cooling metal bases on at least the surface of each of the cooling metal bases being adjacent to the plasma enclosed. It is preferable that a heat resistant member be formed on the low tritium permeable layer on the surface of the vacuum vessel wall.

According to a fifth aspect of the present invention, there is provided the above-described nuclear fusion reactor (see the fourth aspect of the present invention) having the divertor positioned in contact with the former cooling metal base for forming the vacuum vessel, wherein each of the cooling metal bases for forming the vacuum vessel and the divertor has the low tritium-permeable layer having lower tritium permeability than those of the cooling metal bases on at least the surface of each of the cooling metal bases adjacent to the plasma enclosed, the low tritium-permeable layer being 0.1 μm to 30 μm thick and composed by one or more materials having the tritium diffusion coefficient at 600° C. of $1 \times 10^{-9}$ cm$^2$/sec or less and selected from C (carbon), Be, a carbide and an oxide of Be, B$_4$C, an oxide and a nitride of aluminum, a carbide, an oxide and nitride of silicon, an oxide and a nitride of titanium, an oxide and a nitride of chromium, an oxide of manganese and an oxide of zirconium, the heat resistant member is joined to the surface of the low tritium permeable layer by a metal layer formed by one or more materials selected from Be, C (carbon), Al, Ti, Cr, Ni, Fe, Cu, Ag, Au, Mo and W by using a brazing material, the heat resistant member is made of a fiber reinforced heat resistant member whose reinforcement fiber is one or more fibers selected from carbon fiber, SiC fiber, B (boron) fiber and B$_4$C fiber and whose base materials is made of one or more material selected from carbon, SiC, Be, B$_4$C, Be$_2$C, SiO$_2$ and BeO and having a thermal impact coefficient of 20 kW/m, and the cooling metal bases are made of non-magnetic austenitic alloy.

According to a sixth aspect of the present invention, there is provided a nuclear fusion reactor having a low tritium-permeable layer having lower tritium permeability than that of a cooling metal base for forming a refrigerant passage on at least the surface adjacent to plasma enclosed; and a heat resistant and insulating fire member of a level higher than that of the cooling metal base for thermally shielding the low tritium-permeable layer from the plasma or corpuscular rays, the heat resistant and insulating fire member being formed for the low tritium permeable layer.

According to a seventh aspect of the present invention, there is provided a wall of vacuum vessel for a nuclear fusion reactor having a low tritium-permeable layer having lower tritium permeability than that of a cooling metal base for forming a refrigerant passage on at least the surface adjacent to plasma enclosed; and a heat resistant and insulating fire member of a level higher than that of the cooling metal base for thermally shielding the low tritium-permeable layer from the plasma or corpuscular rays, the heat resistant and insulating fire member being formed for the low tritium permeable layer.

Other and further objects, features and advantages of the invention will be appear more fully from the following description.

DETAILED DESCRIPTION OF THE INVENTION

Figure 1:
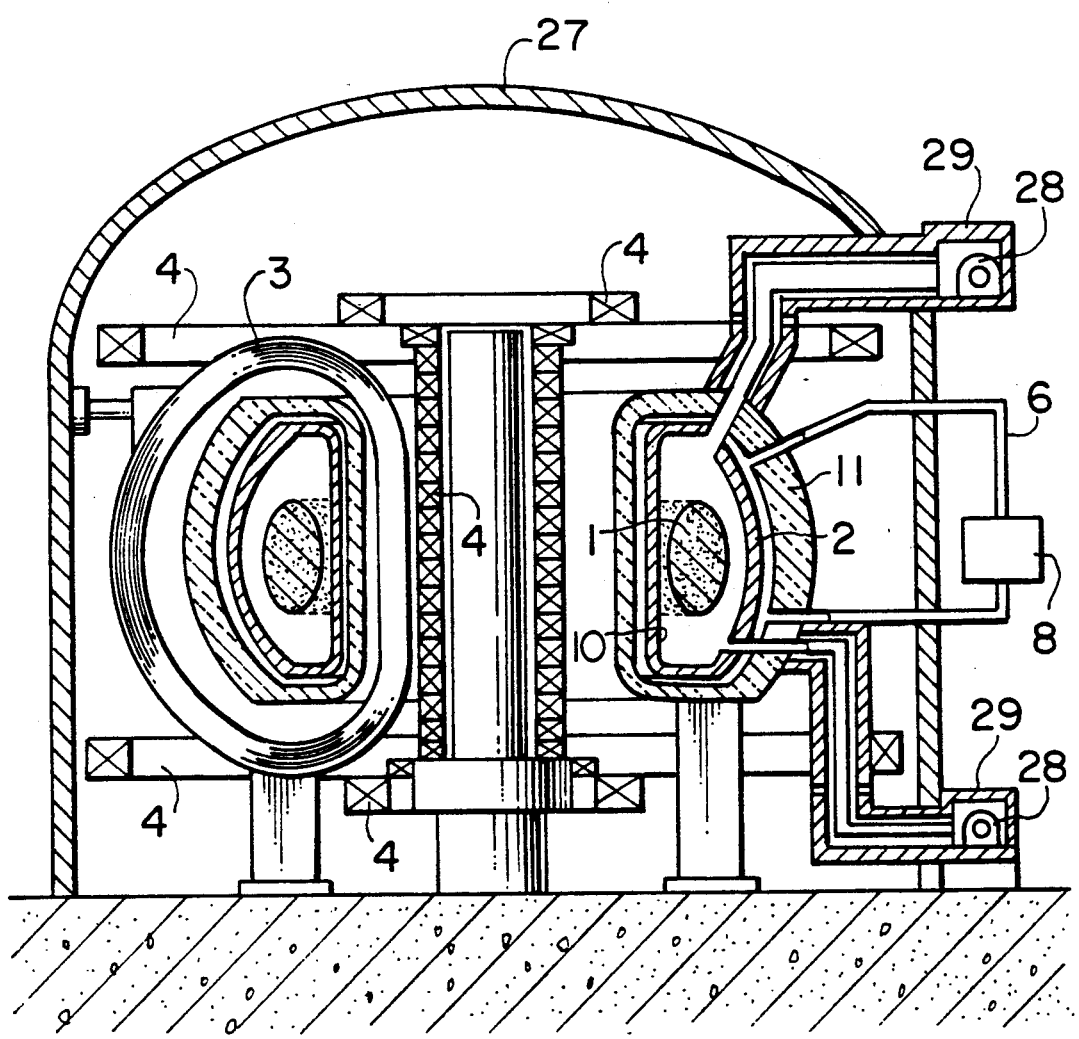
FIG. 1 is a vertical cross sectional view which schematically illustrates the structure of the reactor core of a TOKAMAK nuclear fusion reactor according to the present invention.

According to the present invention, a low tritium-permeable layer for preventing the hydrogen isotope corpuscles from dissolving, diffusing and penetrating into the vacuum vessel and the cooling metal base of the forcible-cooled reactor core wall (so-called first wall) is formed on at least the surface of the vacuum vessel and the cooling metal base of the forcibly cooled reactor core wall exposed to the vacuum.

A heat resistant member is provided such that the low tritium permeable layer is shielded from plasma or corpuscles rays for the purpose of preventing the wear of the low tritium-permeable layer due to the incidental hydrogen isotope plasma corpuscles or corpuscular rays. Furthermore, the provision of heat resistant member prevents the deterioration in the hydrogen diffusion and penetration preventive effect due to the rise of the temperature of the low tritium permeable layer due to heat input from the plasma. In addition, the fusion of the surface of the cooling metal base due to the heat load of the plasma is prevented, and the separation (or peeling off) and the cracks of the surface coating layer due to thermal stress are prevented. In addition, the mixing of the atoms discharged due to the sputtering, the evaporation and the separation of the surface of the cooling metal base, causing the temperature of the plasma to be lowered is prevented.

In order to achieve the above-described object, it is arranged to employ a material for forming the low tritium-permeable layer having the tritium diffusion coefficient $10^{-9}$ cm$^2$/sec at 600° C. which is lower than that of material for the cooling metal base by four or more figures.

In order to achieve the above-described object, the material for forming the low tritium-permeable layer is arranged to be one or more materials having lower diffusion coefficient than that of tritium, the material being selected from C (carbon), Be, a carbide or an oxide of beryllium, B$_4$C, an oxide or a nitride of aluminum, a carbide, an oxide and a nitride of silicon, an oxide and a nitride of titanium, an oxide and a nitride of chromium, an oxide of manganese and the oxide of zirconium.

Furthermore, since the effect of the low tritium permeable layer 9 is rapidly lowered when the thickness is 0.1 μm or less, the thickness of the tritium permeable layer is arranged to be at least 0.1 μm for the purpose of ensuring the effect of the low tritium-permeable layer 9 to prevent the tritium penetration.

A low tritium permeable layer is positioned closely to cover the surface of the inner surface of the vacuum vessel and the surface of the cooling metal base exposed to vacuum in order to prevent the introduction of the hydrogen isotope ambient gas into the interface between the low tritium-permeable layer and the cooling metal base, the introduced hydrogen isotope ambient gas being able to penetrate the cooling metal base and leak out from the reactor core. Furthermore, a low tritium permeable layer is also formed on the surface of the cooling metal base confronting the passage through which the cooling medium passes so that the mixing of tritium, which has reached a position in the vicinity of the passage after it had penetrated the cooling metal base, into the cooling medium is prevented.

Furthermore, the cooling metal medium and the low tritium-permeable layer are arranged to be capable of withstanding the $10^4$ times or more of the thermal (or heat) cycles in the range exceeding 300° C. due to the reactor core plasma, the heat of the corpuscle rays or the heat introduction by various radial rays generated in the reactor core.

In order to achieve the above-described object, the thickness of the low tritium-permeable layer formed closely to the surface of the cooling metal base is arranged to be 0.1 μm or more but 30 μm or less so that the separation of the low tritium-permeable layer is prevented.

In order to achieve this, a transition layer is formed at the interface between the cooling metal base and the low tritium-permeable layer, the composition of the direction of its depth being successively changed.

If the thickness of the low tritium-permeable layer exceeds 30 μm, the low tritium layer sometimes peels off due to the heat cycles caused from the difference in the thermal expansion coefficient between the low tritium layer 9 and the cooling metal base 5.

A metal coating layer is formed for the purpose of preventing the low tritium-permeable layer from being chemically deoxidized by the hydrogen isotope corpuscles which are the major component of the ambient gas in the reactor core of absorbed as heavy water or tritium water. Furthermore, the metal coating layer enables heat resistant members or the like to be metallurgically joined to the top surface of the low tritium-permeable layer.

In order to achieve the above-described object, a metal coating layer made of Cu, Cr, Fe alloy, Ni alloy, Ag, Au, Mo, W and Co is employed.

As a method of forming a low tritium-permeable layer exhibiting excellent adhesion and satisfactory soundness against the heat cycles, a method can be employed, in which plasma or ion beams of one or more elements selected from oxygen, nitrogen, boron, carbon, Mg, Al, Si, Ts, Cr, Mn, Zr is applied to the deposited layer of one or more elements selected from Be, boron, carbon, Mg, Al, Si, Ts, Cr, Mn and Zr on the metal substrate during evaporation of one or more of those elements.

As a method of forming the low tritium permeable layer, a method in which a coating layer containing one or more elements selected from Al, Be, Si, Ti, Cr, Mn and Zr is formed on the surface of the metal base for the vacuum vessel and the cooling metal base and then it is heat-treated in O$_2$, N$_2$ or hydrocarbon can be employed. This method enables a close low tritium-permeable layer to be formed.

Furthermore, the low tritium-permeable layer can be easily formed on a complicated shape and large-area inner wall even after the reactor core members such as the vacuum vessel and the cooling metal base have been fastened by vacuum-discharging the vacuum chamber before or after the heat resistant member has been fastened, introducing one or more gases selected from $O_2$, $N_2$, hydrocarbon gas, $SiH_4$ gas or $NH_3$ gas or a mixed gas of the above-described gas and a carrier gas such as $H_2$, $D_2$ or rare gas, and performing a plasma discharge.

In the above-described method, the low tritium-permeable layer can be formed at a high film forming speed by employing a method in which a metal element Be, boron, Si, Al, Ti, Cr or Zr is deposited on the inner wall of the vacuum vessel or the surface of the cooling metal base simultaneously with the plasma discharge by using those elements as evaporation source.

In the case where the metal coating layer is formed on the surface of the low tritium-permeable layer, the adhesion between the low tritium-permeable layer and the cooling metal layer can be improved by forming a transition layer, in which its composition successively changes in the direction of the depth, at the boundary from the metal base.

In order to achieve the above-described object, a method in which elements forming the metal coating layer is deposited by evaporation with applying the ion beams of the elements forming the low tritium-permeable layer and the intensity of the ion beams is gradually weakened in accordance with the forming of the film.

On the other hand, in order to prevent the fusion of the surface of the heat resistant member due to the heat load of the reactor core plasma or the corpuscles rays, it is preferable that the fusing point of the heat resistant member is 2000° C. or higher.

In order to achieve the above-described object, it is preferable that the heat resistant member is formed by one or more materials selected from carbon, Be, a carbide or a nitride of beryllium, SiC, $B_4C$, a carbide of titanium, Mo, W and Re.

It is also preferable that the component element of the heat resistant member is an element whose atomic number is 14 or less in order to prevent the mixing of the component atoms ejected from the surface of the heat resistant member of the above-described heat resistant members which is positioned to confront the reactor core plasma by the incidence of the plasma corpuscles into the plasma and the temperature of the reactor core plasma is thereby lowered or the plasma confining conditions are made unstable.

In order to prevent the heat resistant member from being broken by the thermal impact due to the instantaneous introduction of heat or rapid stop of heat of the plasma or the corpuscular rays, the material is selected and evaluated. As a result, it has been found that it is preferable that the thermal impact parameter (R') obtained from the specific values of Young's modulus (E), the thermal expansion co-conductivity efficient ($\alpha$), the thermal conductivity (K), the tensile strength ($\sigma_t$), Poisson's ratio ($v$) and by Equation (1) be 20 kW/m or more:

$$R' = \frac{K\sigma_t(1 - v)}{E\alpha} \quad (1)$$

In order to meet the above-described equation, it is preferable that the material be formed by one or more materials selected from carbon fiber reinforced carbon-matrix matrix material, carbon fiber reinforced silicon-matrix material, carbon fiber reinforced beryllium-matrix material, boron fiber reinforced carbon-matrix material, carbon fiber reinforced $B_4C$-matrix material, SiC fiber reinforced SiC-matrix material, carbon fiber reinforced $Be_2C$ matrix material, beryllium fiber reinforced carbon-matrix material and SiC fiber reinforced $B_4C$-matrix material.

In order to prevent the temperature of the heat resistant member from rising excessively due to the introduction of heat of plasma or the corpuscular rays, the heat resistant member is brought into contact with the cooling metal base via the low tritium-permeable layer and the metal coating layer or joined metallurgically.

In order to achieve the same object as above, it is applied to a divertor neutralizing plate.

In order to prevent the leaking out of tritium into the cooling medium from a beam damper portion of a neutral corpuscles incidental heating device for injecting tritium neutral corpuscles into the reactor core so as to heat the reactor core plasma, the similar structure is employed.

OPERATION

The heat resistant member, formed between the low tritium permeable layer formed on the surface, exposing to vacuum, of the vacuum vessel and the cooling metal base and the space in which the reactor core plasma or the corpuscles rays act in such a manner that the corpuscles or the corpuscular rays leaked from the plasma are shielded, protects the low tritium-permeable layer from the above-described corpuscles or corpuscular rays or the introduction of the radiated heat. Therefore, the temperature rise of the low tritium-permeable layer during the operation can be restricted to a low level in comparison to a case in which no heat resistant member is provided. Therefore, the diffusing speed of tritium can be significantly lowered. As a result, the introduction, the diffusion of tritium in the cooling metal base and the tritium penetration quantity through the same can be reduced. Simultaneously, the low tritium permeable layer can be protected from the breakdown due to the cycling heat load, and the introduction of tritium into the cooling metal base along the cracks generated due to the breakdown can be restricted. In addition, the leaked corpuscles or corpuscular rays from the plasma having kinetic energy exceeding several tens electron volt (eV) and capable of ejecting atoms existing in the surface layer can be prevented from being made incident upon the surface of the low tritium-permeable layer. Therefore, the low tritium-permeable layer can be protected from the wear due to the sputtering, or the wear due to the de-oxidation or decomposition due to chemically active hydrogen isotope can be prevented. Furthermore, the mixing of atoms discharged from the surface of the low tritium permeable layer due to the sputtering, de-oxidation and the decomposition into the reactor plasma as impurities and the temperature of the plasma is thereby lowered can be prevented.

Furthermore, the low tritium permeable layer formed on the surface of the cooling metal base is made of one or more materials selected from carbon, Be, a carbide or an oxide of beryllium, $B_4C$, an oxide or a nitride of aluminum, a carbide of silicon, an oxide or a carbide of chromium, an oxide of manganese, and an oxide or a carbide of zirconium, the material having the diffusion speed with respect to tritium is smaller than that of the cooling metal base by at least 4 figures. Therefore, the quantity of tritium penetration can be reduced. Furthermore, since the thickness of the low tritium-permeable layer is arranged to be 0.1 μm or more, the surface of the cooling metal base can be covered with a continuous film. Therefore, the tritium diffusion and penetration preventive effect can be ensured. If the thickness of the low tritium permeable layer is 0.1 μm or less, the tritium penetration preventive effect is considerably deteriorated.

Since the low tritium permeable layer is formed closely to the cooling metal base, gas can not be confined between the low tritium-permeable layer and the cooling metal base and the ultra-vacuum exhaust characteristics cannot thereby be deteriorated. Furthermore, dissolved hydrogen atoms do not deposit and recombine together in the interface between the low tritium-permeable layer and the cooling metal base and do not become gaseous. Therefore no air bubbles causing the low tritium permeable layer to deteriorate are formed. The low tritium-permeable layer is also formed on the surface of the cooling metal base adjacent to the passage. In this case, the mixing of tritium atoms penetrated from the vacuum side with the cooling medium can be prevented on the surface of the passage. Furthermore, the dissolution of hydrogen atoms generated due to the decomposition of the cooling medium by heat and radial rays can also be prevented.

Since the thickness of the low tritium-permeable layer is arranged to be 30 μm or less and the transition layer is disposed between the low tritium-permeable layer and the cooling metal base, the concentration of shearing thermal stress generated at the interface due to the imbalance in the thermal expansion coefficient between the low tritium-permeable layer and the cooling metal base can be prevented. Therefore, the low tritium-permeable layer can be protected from damage due to repeated thermal stress.

It is particularly preferable that the metal coating layer be formed on the surface of the low tritium-permeable layer since the low tritium-permeable layer is directly brought into contact with hydrogen isotope corpuscles which are the ambient gas component in the vacuum vessel and is decomposed, causing the discharge of the generated gas into vacuum to be prevented. Furthermore, in the case where the heat resistant member for protecting the low tritium-permeable layer from plasma or corpuscular rays is metallurgically joined to the surface of the cooling metal base, the wettability of the surface of the low tritium-permeable layer with metal can be improved. As a result, the metallurgical joining can be easily conducted. Since Cu, Cr, austenitic stainless steel (JIS SUS 304), Ni alloy, Au, Mo and W can be readily recombined and re-discharged even if hydrogen molecules have been adsorbed or dissociated, the tritium penetration into the reactor core wall material can be effectively improved.

It is preferable that the heat resistant member provided for the purpose of protecting the low tritium-permeable layer from the plasma corpuscles and corpuscular rays be arranged to have the fusing point of 2000° C. or higher and the thermal impact parameter of 20 kW/m or more. Therefore, the heat resistant member can be protected from thermal or thermomechanical damage even if the heat load of plasma corpuscles or corpuscular rays is introduced.

It is preferable that the heat resistant member of the above-described heat resistant members which is disposed to confront the reactor core plasma is made of a light element whose atomic number is 14 or less. As a result, the heat resistant member can be protected from wear in a short time by the plasma corpuscles or corpuscular rays. Therefore, the necessity of change of the heat resistant member can be eliminated. Furthermore, a problem of difficulty of maintaining the nuclear fusion reaction conditions due to the mixture of the component element ejected from the heat resistant member into the reactor core, causing the temperature of the plasma to be lowered, can be prevented.

In the case where the thermal flux from the plasma is large and the excessive rise in temperature of the heat resistant member cannot be prevented by the cooling with the radiation, the heat resistant member is mechanically brought into contact with the cooling base or metallurgically joined with the same so as to be fastened thereto. In the case where it is metallurgically joined, the metal coating layer on the low tritium-permeable layer improves the wettability of the brazing material, causing the joining to be performed assuredly. In the case where the low tritium-permeable layer is provided on at least the surface of the heat resistant member adjacent to the cooling metal base, the heat resistant member is directly and metallurgically joined to the cooling metal base and the low tritium-permeable layer is formed on the surface of the cooling metal base in the gap portions between the heat resistant members. As a result, the surface of the cooling metal base adjacent to the vacuum can be substantially covered with the low tritium-permeable layer. In this case, the heat resistant member is disposed so as to shield the low tritium-permeable layer from the plasma corpuscles or corpuscular rays. Therefore, the low tritium-permeable layer can be protected from damage due to the application of plasma corpuscles or corpuscular rays.

DESCRIPTION OF THE PREFERRED EMBODIMENTS

Example 1

FIG. 1 is an overall cross sectional view which illustrates a TOKAMAK nuclear fusion reactor according to the present invention. A reactor core plasma 1 the discharge gas of which is composed by a mixed gas of heavy hydrogen and tritium is stably confined in a vacuum vessel 2 by a torus equilibrium confining magnetic field formed in the vacuum vessel 2 by a plurality of toroidal coils 3 arranged so as to be wound around the torus vacuum vessel 2 and a plurality of poloidal coils 4 which are coaxially arranged with respect to the vacuum vessel 2, the plurality of poloidal coils 4 being arranged symmetric vertically. A vacuum vessel cooling system 6 is provided around the vacuum vessel 2 so that the vacuum vessel 2 is cooled.

Figure 3:
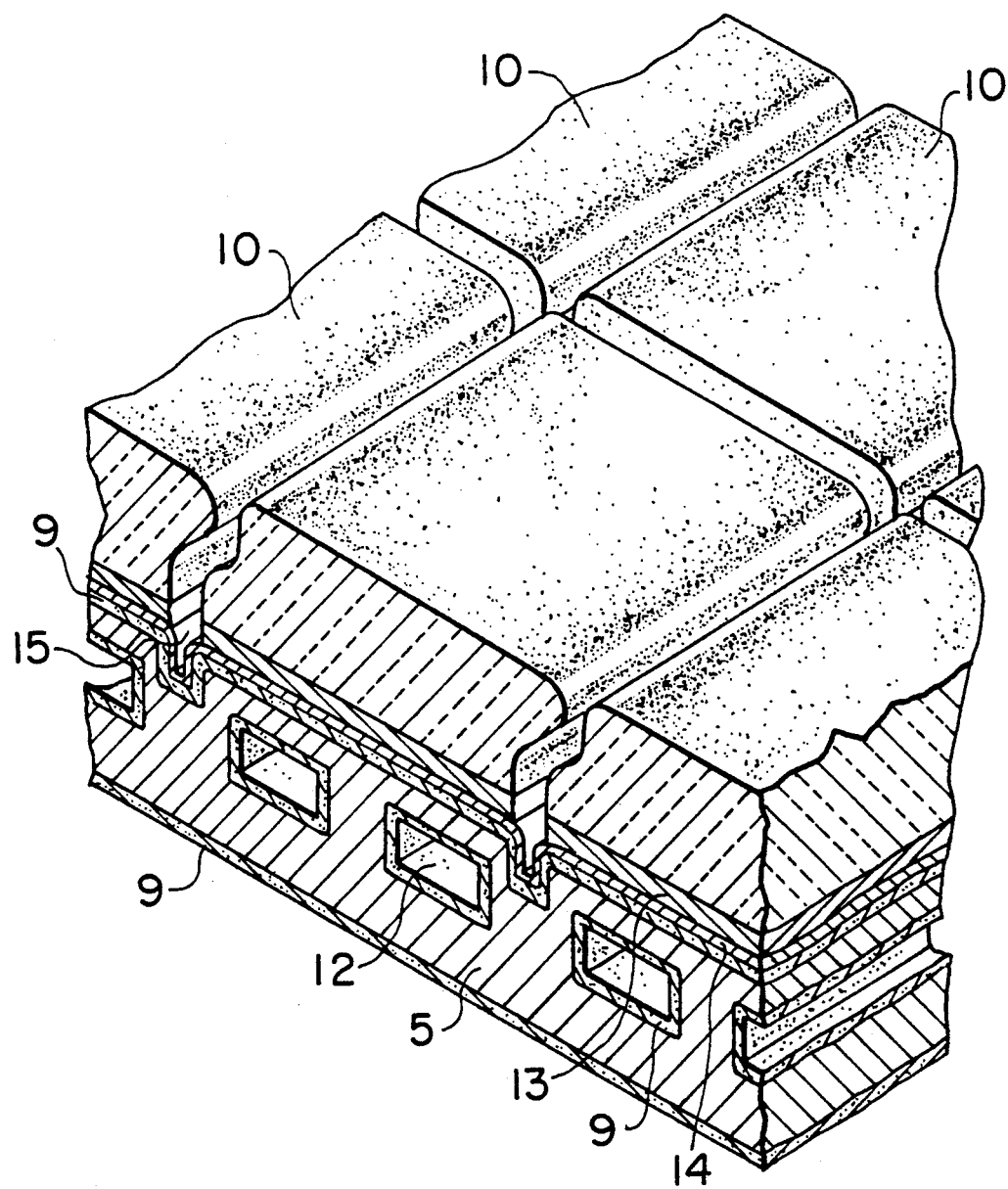
FIG. 3 is a perspective view which illustrates the detailed structure of a first embodiment of the reactor core wall shown in FIG. 2.

As shown in FIG. 3 which will be described later, a cooling metal base 5 is provided for a region of the inner wall of the vacuum vessel 2 which will be exposed to plasma or heat flux heated by an incidental corpuscular beam for heating the plasma, the cooling metal base 5 being cooled by a system 7 for forcibly cooling the metal base 5. A tritium separating and recovering device 8 is provided for the vacuum vessel cooling system 6 and the system 7 (FIG. 8) for forcibly cooling the metal base 5 so that heavy hydrogen and tritium, which are mixed into a cooling medium after being passed through the wall surface 2 of the vacuum vessel 2 which serves as a reactor core chamber or the cooling metal base 5, are separated from the cooling medium and recovered. In order to reduce the burden upon the tritium separating and recovering device 8, it is necessary to reduce the quantity of the leakage of tritium to the vacuum vessel cooling system 6 and the system 7 (see FIG. 8) for forcibly cooling the cooling metal base 5. Therefore, a low tritium-permeable layer 9 is formed on the inner surface of the vacuum vessel 2 and on the surface of the wall of the cooling metal base adjacent to the vacuum. As a result, the absorption of hydrogen isotope corpuscles (molecular or atomic hydrogen, tritium water molecules, tritium carbide), enclosed in the vacuum vessel 2 serving as the reactor core chamber, to the inner wall of the vacuum vessel 2 and the cooling metal base 5 are prevented. Therefore, the mixing of tritium atoms into the cooling medium after they have reached the surface adjacent to the cooling medium is prevented. If neutral hydrogen isotope corpuscles having relatively large energy of impure particles which have been directly leaked out from the reactor core plasma or neutral hydrogen isotope corpuscular ray is made incident upon the surface of the low tritium-permeable layer 9 and if it is heated, the low tritium-permeable layer 9 is damaged, and what is even worse, the effect of preventing the penetration of tritium is lost. Therefore, a heat resistant member 10 is disposed between the low tritium-permeable layer and the reactor core plasma so as to shield the low tritium-permeable layer 9 from plasma or corpuscular ray. As a result of the thus arranged structure in which the heat resistant member 10 is interposed as described above, the low tritium permeable layer 9 can be maintained at a low temperature. Therefore, the penetration of tritium can be effectively prevented. According to this embodiment, the heat resistant member 10 is arranged to be a multiplicity of sectioned tiles so that the electromagnetic force acting on the heat resistant member 10 due to the large change of the plasma current is reduced below an allowable level. Furthermore, the size of the heat resistant member 10 is so properly arranged to reduce the thermal stress taking place at the time of metallurgically or mechanically fastening the heat resistant member 10 to the inner surface of the cooling metal base 5 or that of the vacuum vessel 2. In the case where the electric conductivity of the heat resistant member 10 is a certain low level, the heat resistant member 10 may be integrally formed. A shielding member 11 is disposed between the vacuum vessel 2 and the toroidal coil 3 and the poloidal coil 4 for the purpose of stopping fast neutrons and γ-ray, the fact neutrons being the corpuscles generated in the reactor core by a nuclear fusion reaction.

Referring to the drawing, reference numeral 27 represents a bell jar (or container vessel), 28 represents a vacuum pump and 29 represents an exhaust duct shielding member.

A shielding member 11 is disposed so as to surround the vacuum vessel 2 for the purpose of preventing the leakage of neutrons and γ-ray. The shielding member 11 has openings formed therein and arranged to be provided with a divertor for neutralizing and exhausting ionized corpuscles for preventing impurities in the plasma 1.

Figure 11:
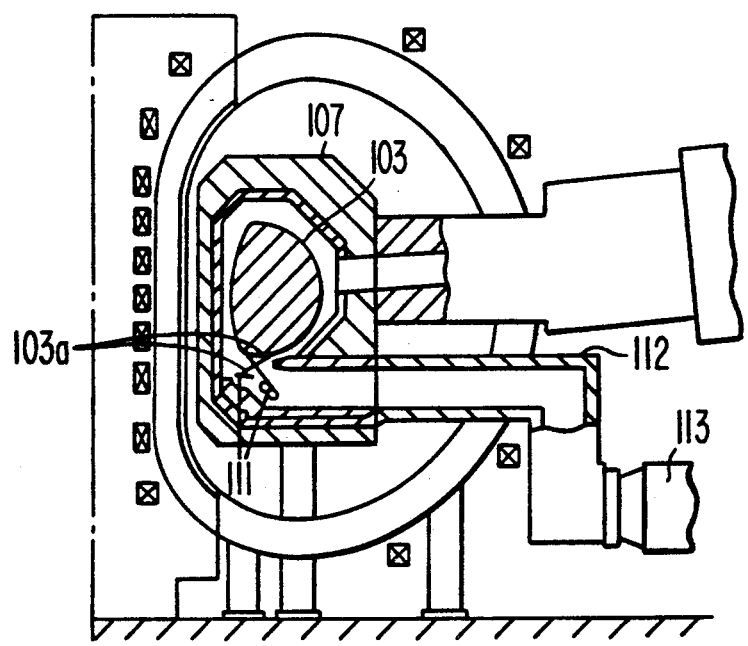
FIG. 11 is a cross-sectional view which schematically illustrates the structure of a reactor core, including a divertor.

FIG. 11 illustrates a divertor which can utilize structure according to the present invention. Shown is a vertical section of a conventional Torus-type nuclear fusion reactor with divertor plates 111. The divertor plates 111 are contained in a vacuum vessel 107 with a doughnut shape which is surrounded by a toroidal coil of magnetic field. The divertor plates 111 are irradiated with a part 103a of plasma 103 formed in the vacuum vessel 107. Neutralized gas is exhausted out of the vacuum vessel 107 by a vacuum pump 113 via an exhaust pipe 112. The divertor is used to exhaust impurities which are produced by sputtering of He and plasma generated in the vacuum vessel 107.

Figure 2:
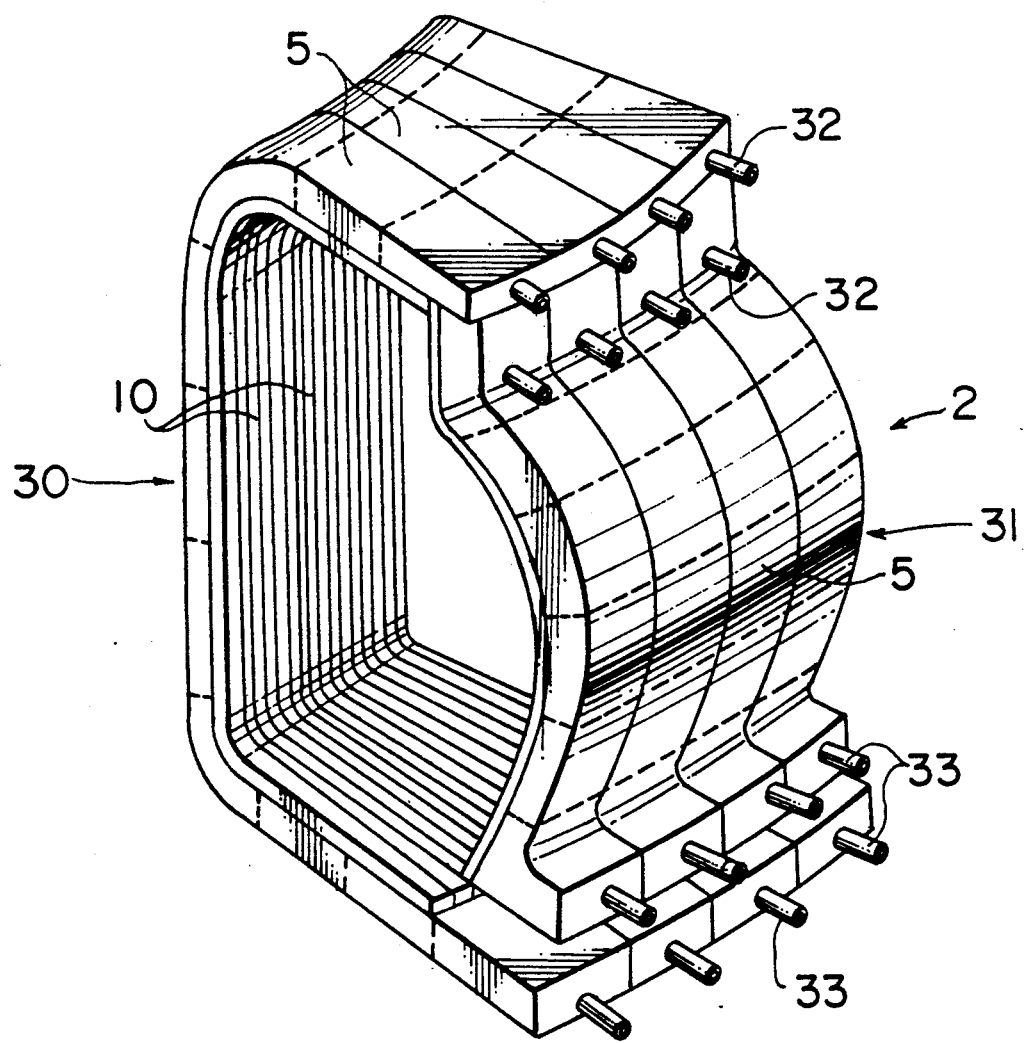
FIG. 2 is a perspective view which illustrates an example of the structure of the reactor core wall (so-called first wall) of the vacuum vessel shown in FIG. 1.

The ionized corpuscles are introduced into lines of magnetic force. The copuscles, the main ingredient of which is fuel including impurities which have been neutralized after they have collided with a neutralizing plate provided for stopping the lines of magnetic force, are exhausted through an exhaust duct. FIG. 2 is a partial perspective view which illustrates the vacuum vessel 2 according to the present invention. As shown in FIG. 2, the vacuum vessel 2 according to the present invention is formed by integrally joining a plurality of cooling metal base segments as designated by short dashes lines. The heat resistant member 10 is metallurgically joined to the cooling metal base 5 on its side adjacent to the reactor core. As shown in FIG. 3 which will be described later, the low tritium permeable layer 9 is formed on the surface of the cooling metal base 5, the surface of the layer being joined with the heat resistant member 10. The cooling metal base segments, having tile-like heat resistant members 10 which have been previously and metallurgically joined on the segments, are integrally joined to one another by welding so as to become as illustrated. Although the low tritium layer is removed at the time of welding, the low tritium layer can be formed so as to be the desired number of layers as described later. Therefore, the low tritium permeable layer can be extremely efficiently formed. Reference numeral 30 represents an inner wall of the vessel 2 and 31 represents an outer wall of the vessel 2 each of which is cooled by cooling medium fed into inner passages of the both walls having inlet and outlet pipes 32, 33 which is connected with the passages.

FIG. 3 is a perspective view which illustrates the detailed structure of a wall of the vacuum vessel 2 or the cooling metal base 5 according to the present invention. Cooling medium passages 12 are formed in the cooling metal base 5 made of austenitic stainless steel of JIS SUS 304, and grooves 15 are formed on the base 5 between each of the heat resistant members 10. A continued low tritium-permeable layer 9 is so closely formed on the outer surface of the cooling metal base 5. A metal coating layer 14 is, also, closely formed on the surface of the low tritium-permeable layer 9, and the heat resistant member 10 is, via an intermediate member 13, is brazed on the metal coating layer 14. The space between the adjacent heat resistant members 10 are arranged to be bent shapes so that the surface of the low tritium-permeable layer 9 which is not covered with the heat resistant member 10 is protected from plasma corpuscles or corpuscles rays. As a result, the low tritium-permeable layer 9 is protected from a damage due to the sputtering by the incidental corpuscles, causing the life of the low tritium-permeable layer 9 to be lengthened. Since the effect of preventing the penetration of tritium of the low tritium-permeable layer 9 is lowered in inverse proportion to the temperature (due to an increase in the diffusion co-efficient), the shielding of the surface of the low tritium permeable layer 9 with the heat resistant member 10 will restrict the temperature of the low tritium-permeable layer 9 at a significantly low level. Therefore, the effect of preventing the penetration of tritium can be improved by several to several tens times.

An example of a method of forming the low tritium-permeable layer 9 on the surface of the cooling metal base 5 will now be described. A 20 mm thick JIS SUS 304 stainless steel base as shown in FIG. 3 was used as the cooling metal base 5. The stainless steel was submerged in a coating agent consisting of 28 wt % Al, 2 wt % NH$_4$Cl and a balance Al$_2$O$_3$, and was then subjected to a coating treatment in an argon gas ambient at 800° C. for three hours. Then, the stainless steel was taken out from the coating agent, and the coating layer was diffused in an argon gas ambient at 1000° C. for one hour. Then, it was subjected to an oxidation in atmospheric ambient at 700° C. for 5 hours so that a 3 μm Al$_2$O$_3$ coating layer was formed.

Then, a 0.2 mm thick test piece one side of which was coated with the Al$_2$O$_3$ coating layer was cut out from the JIS SUS 304 cooling metal base 5 coated with the Al$_2$O$_3$ coating layer. The test piece was subjected to a comparison with a JIS SUS 304 comparative piece having no Al$_2$O$_3$ coating layer, resulting that the solubility of heavy hydrogen in the Al$_2$O$_3$ film was $3 \times 10^{16}$ atom/cm$^3$, while that in JIS SUS 304 steel was $5 \times 10^{18}$ atom/cm$^3$. The diffusion coefficient of heavy hydrogen in the Al$_2$O$_3$ coating layer was about $10^{-12}$ cm$^2$/s, while that in JIS SUS 304 steel was $8 \times 10^{-12}$ cm$^2$/s, The quantity of penetration of heavy hydrogen in the test piece coating with no Al$_2$O$_3$ coating layer was about $10^{15}$ D atom/cm$^2$ sec, while that in the test piece coated with the Al$_2$O$_3$ layer was smaller than the detectable sensitivity. Thus, the Al$_2$O$_3$ coating layer caused the reduction in the penetrating ratio at least exceeding $10^{-4}$.

A 1 μm thick metal layer 14 made of Ni was, by sputtering, formed on the surface of the cooling metal base 5 coated with the low tritium-permeable layer 9 made of Al$_2$O$_3$ to be joined with the heat resistant member 10. Then, the heat resistant member 10 consisting of a 50 μm thick foil made of an Ag-28 wt. % Cu alloy, a 2 mm thick Mo plate, a 50 μm thick foil made of a Ag-28 wt. % Cu-5 wt. % Ti brazing alloy, and a carbon fiber (felt carbon) reinforced carbon material is layered on the metal coating layer 14. As a result, the thus layered members were allowed to stand in vacuum of $2 \times 10^{-5}$ Torr or less at 850° C. for 30 minutes before they have been gradually cooled. As a result, a reactor core wall (so-called a first wall) member formed by metallurgically joining the heat resistant member 10 with the cooling metal base 5 via the low tritium permeable layer 9 was obtained as shown in FIG. 3.

The Al$_2$O$_3$ layer applied to the inner surface of the cooling medium passage 12 effectively prevents the leakage of tritium dissolved into the cooling metal medium 5 into the cooling medium. Furthermore, it effectively reduces the wear speed of the inner wall by the cooling medium passing through the cooling medium passage 12. In addition, since the Al$_2$O$_3$ layer can be maintained at a significantly low temperature by a cooling medium, the penetration of tritium into the cooling medium can be further prevented.

Example 2

Figure 4:
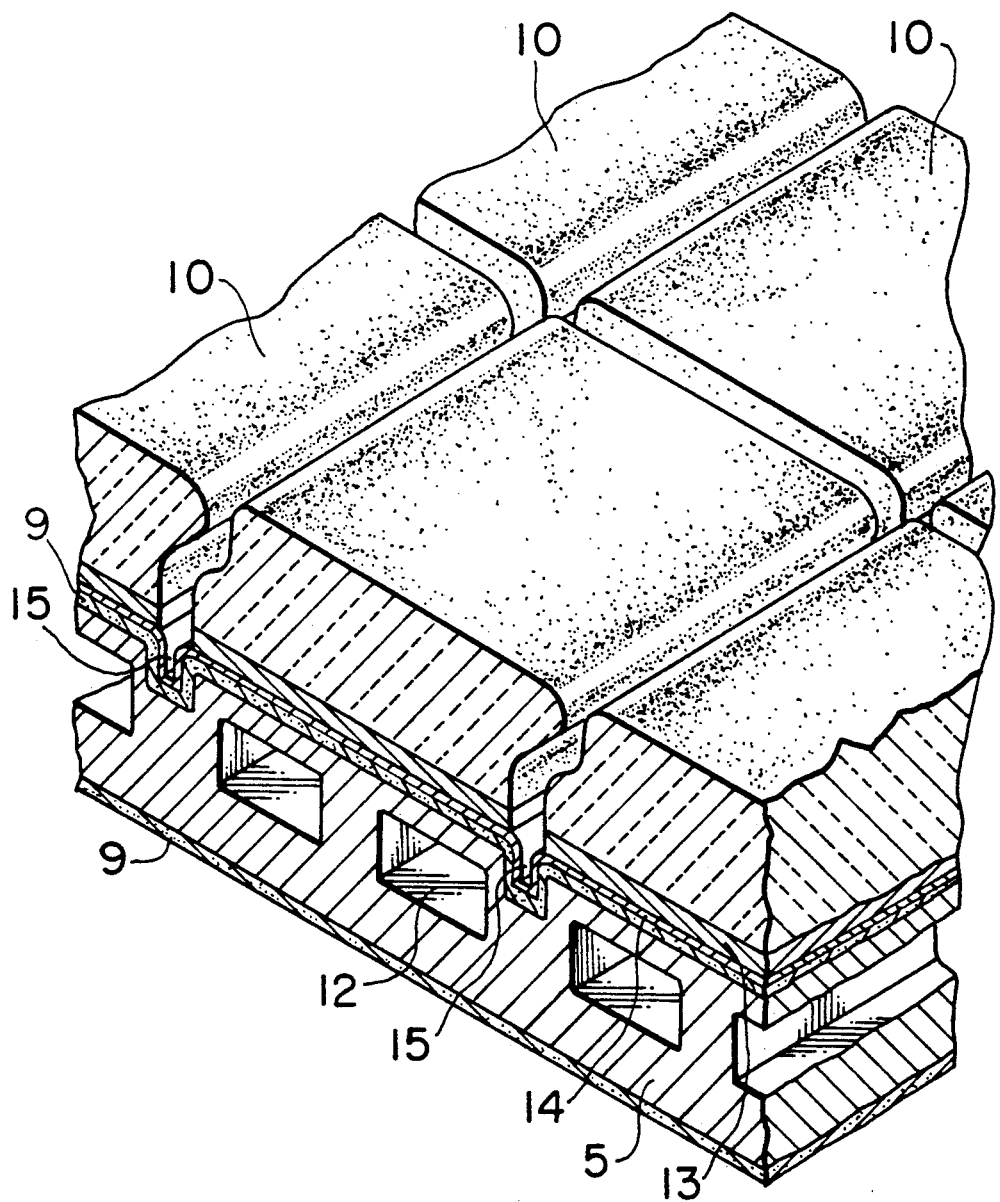
FIG. 4 is a perspective view which illustrates the detailed structure of another embodiment of the reactor core wall shown in FIG. 2.

FIG. 4 is a perspective view which illustrates another embodiment of the vacuum vessel made of the cooling metal base having the heat resistant members of the reactor core wall structure shown in FIG. 3.

Cooling medium passages 12 are in parallel arranged in the JIS SUS 304 stainless steel cooling metal base 5. The heat resistant members 10 are, at predetermined intervals, applied to the surface of the cooling metal base 5. Grooves 15 for formed in the surface of the cooling metal base 5 between the heat resistant members 10. As a result, thermal stress generated in the joints between the heat resistant members 10 and the cooling metal base 5 by the heat load can be relaxed. A 10 μm thick AlN film is formed as the low tritium-permeable layer 9 is formed on the surface of the cooling metal base 5. A 1 μm thick metal coating layer 14 is formed on the surface of the low tritium-permeable layer 9. Furthermore, the heat resistant members 10 manufactured by the carbon fiber reinforced carbon composite material via the Mo intermediate member 14 by the method similar to that shown in FIG. 3 are metallurgically joined above the metal coating layer 14.

The AlN low tritium permeable layer 9 was formed by a dynamic ion mixing method in which Al was evaporated by a resistant heating method with applying nitrogen ions accelerated to 40 kV at an ion density of $5 \times 10^{17}$ piece/cm$^2$ sec to the surface of the cooling metal base 5 in vacuum. The metal coating layer composed by Ni was formed by a method in which Ni ions were applied with evaporating Ni after the AlN film had been formed and the intensity of the application of the ions was weakened so as to change to only the Ni evaporation. There was a 50 nm thick transition layer in which the compositions of each of the layers were mixed on the interface between the JIS SUS 304 stainless steel and the AlN layer and that between the AlN layer and the Ni film. According to this method, an excellent bonding strength was realized in each of the boundary surfaces such that separations or cracks were not observed even after a thermal cycle test applying a heat load to the reactor core wall, for example, in typical conditions: temperature range from room temperature to 400° C., the pulse length 800s and the number of repetitions $3 \times 10^4$.

In order to examine the tritium permeability preventive characteristics of the AlN film formed by the above-described dynamic mixing method, a test piece of 0.2 mm thick JIS SUS 304 stainless base was cut out from the JIS SUS 304 stainless cooling metal base covered with the AlN film so as to be compared with a comparative JIS SUS 304 stainless steel which was not covered with the AlN film. The solubility of heavy hydrogen in the AlN film at 600° C. was $3 \times 10^{17}$ atom/cm$^3$, while the diffusion coefficient of heavy hydrogen was $1 \times 10^{-12}$ cm$^2$/sec in the AlN film. On the other hand, the solubility and the diffusion coefficient of heavy hydrogen in JIS SUS 304 stainless steel were $5 \times 10^{18}$ atoms/cm$^3$ and $8 \times 10^{-6}$ cm$^2$/sec, respectively. The quantity of the penetration of heavy hydrogen at 600° C. was evaluated, resulting such that the test piece coated with the AlN layer displayed a low quantity of the penetration of heavy hydrogen of $10^{-4}$ or less in comparison to the test piece without the above-described coating. Also according to this embodiment, since the AlN film can be maintained at desired low temperature by the temperature of the refrigerant. Therefore, the quantity of the tritium penetration can be further reduced.

Example 3

Figure 5:
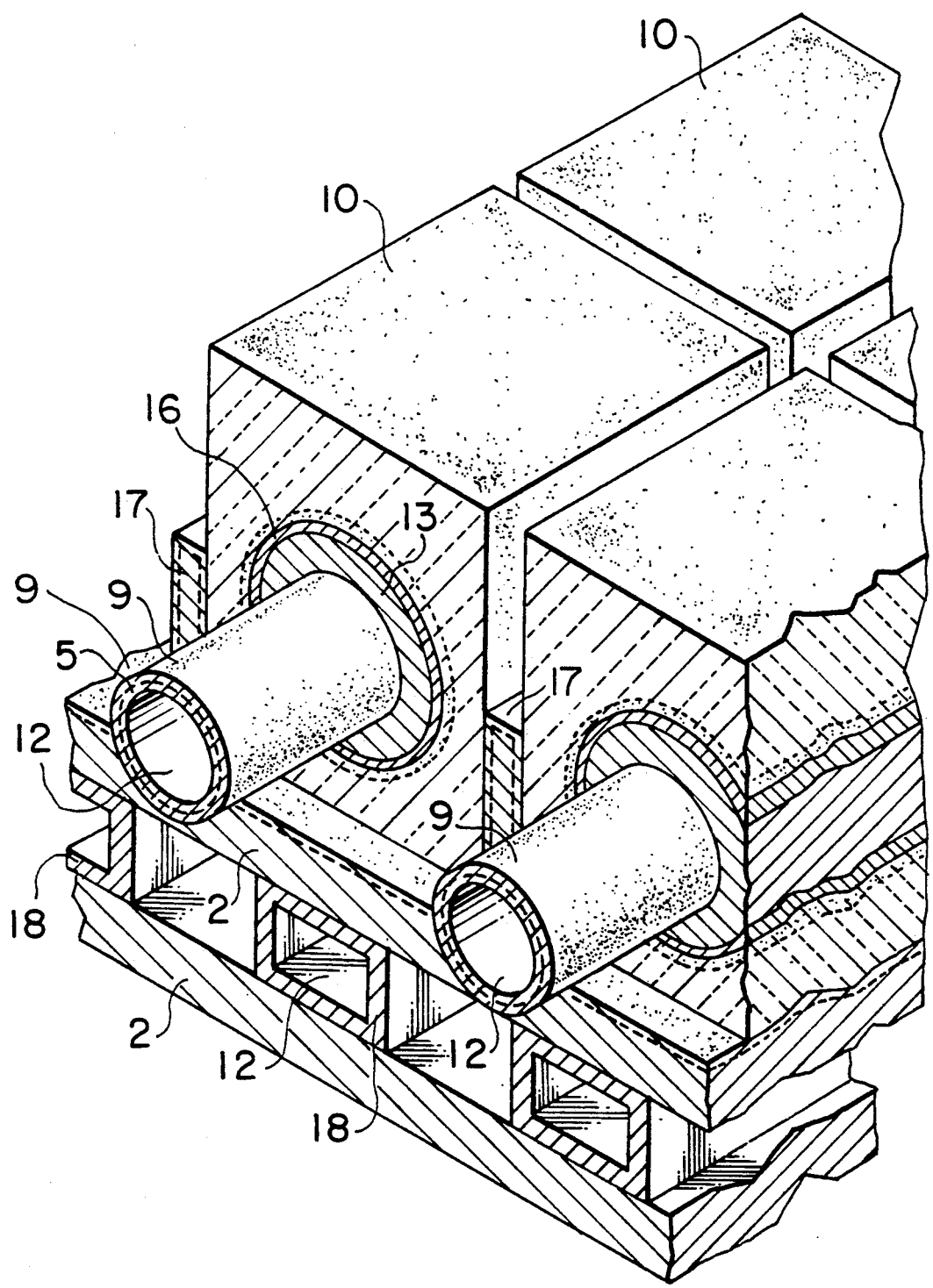
FIG. 5 is a perspective view which illustrates the detailed structure of a modification relating to a divertor of the reactor core wall shown in FIG. 2.

FIG. 5 is a partial perspective view which illustrates another example of the structure of the cooling metal base 5 and the vacuum vessel 2 having the divertor reactor core wall structure according to the present invention and shown in FIG. 1. The low tritium-permeable layer 9 is formed on the surface of the vacuum vessel 2 which is formed by coupling two sections with supporting tubular members 18 having the cooling medium passages 12 held therebetween. The heat resistant members 10 formed by blocks made of carbon-fiber reinforced carbon composite material are applied to the inner surface of the vacuum vessel 2 for the purpose of protecting the vacuum vessel 2 from the incidental corpuscles from the plasma, the heat resistant member 10 being secured to the inner surface of the vacuum vessel 2 by means of fixing ribs 17. The cooling metal bases 5 penetrate the heat resistance members 10. The low tritium permeable layer 9 is formed around the pipe-like cooling metal base 5. The cylindrical intermediate member 13 is disposed between the cooling metal base 5 and the heat resistant member 10, the cylindrical intermediate member 13 being thermally and mechanically coupled with the cooling metal base 5 and the heat resistant member 10. The material of the intermediate member 13 is Mo, the intermediate member 13 and the heat resistant member 10 being metallurgically joined with each other by a brazing material layer 16 made of Zr-Mo made of Zr-Mo eutectic alloy.

Since the cooling metal base 5 is arranged in the form of a cylinder, the cross sectional deformation of the cooling metal base 5 due to high pressure cooling water of several tens atmospheres passing through the internal cooling medium passage 12 can be prevented. Furthermore, since the structure is so arranged that the cooling metal bases 5 penetrate the heat resistant members 10, the contact area between the heat resistant member 10 and the cooling metal base 5 can be enlarged, causing the thermal stress generated due to the uniformity of the heat flux introduced into the cooling metal base 5 to be reduced. Therefore, the soundness of the structure was improved. Furthermore, even if the heat resistant member 10 is broken due to the thermal stress, it cannot be easily separated from the cooling metal base 5.

The Mo layer disposed as the intermediate member 13 between the heat resistant member 10 and the cooling metal base 5 performs a critical role for preventing the breakdown of the cooling metal base 5. That is, if the plasma density becomes a low level, for example, the confining conditions become worsened in a magnetic field confined type nuclear fusion reactor, or in a boundary plasma region in which the plasma density is at a low level, the generation of so called run away electrons has been known such that electrons in the plasma are gradually accelerated by the surrounding electric field and the electrons are then made in the form of a high energy electron beam raised to several tens mega-electron volt (MeV). For example, as disclosed in Journal of Nuclear Materials 133 & 134 (1985) pages 18 to 24 by W. M Romer, a case was disclosed such that high energy run away electrons of the level up to 20 MeV were generated, causing the reactor core plasma to move in the central axial direction on the equatorial plane of the apparatus and, the run away electrons made hit upon the inner wall of the vacuum vessel in the vicinity of the equatorial plane caused a local thermal load of 8 MJ/cm$^2$ was reported. The run away electrons are made incident upon the surface of the heat resistant member 10 and penetrate by a depth of several tens of millimeter in the case of graphite, causing high density heat in the deep portion of the material.

The intermediate member 13 serves as a protection layer against the incidental run away electrons of the type described above. That is, heat resistant metal having a large mass and high fusing point such as Mo, W, Zr or the like has a significant deceleration effect against the run away electrons having extremely large energy. Therefore, it can protect the cooling metal base 5 from the damage due to the hitting of the run away electrons. Furthermore, it also acts to prevent the breakdown of the low tritium-permeable layer 9 formed on the cooling metal base 5.

Figure 6:
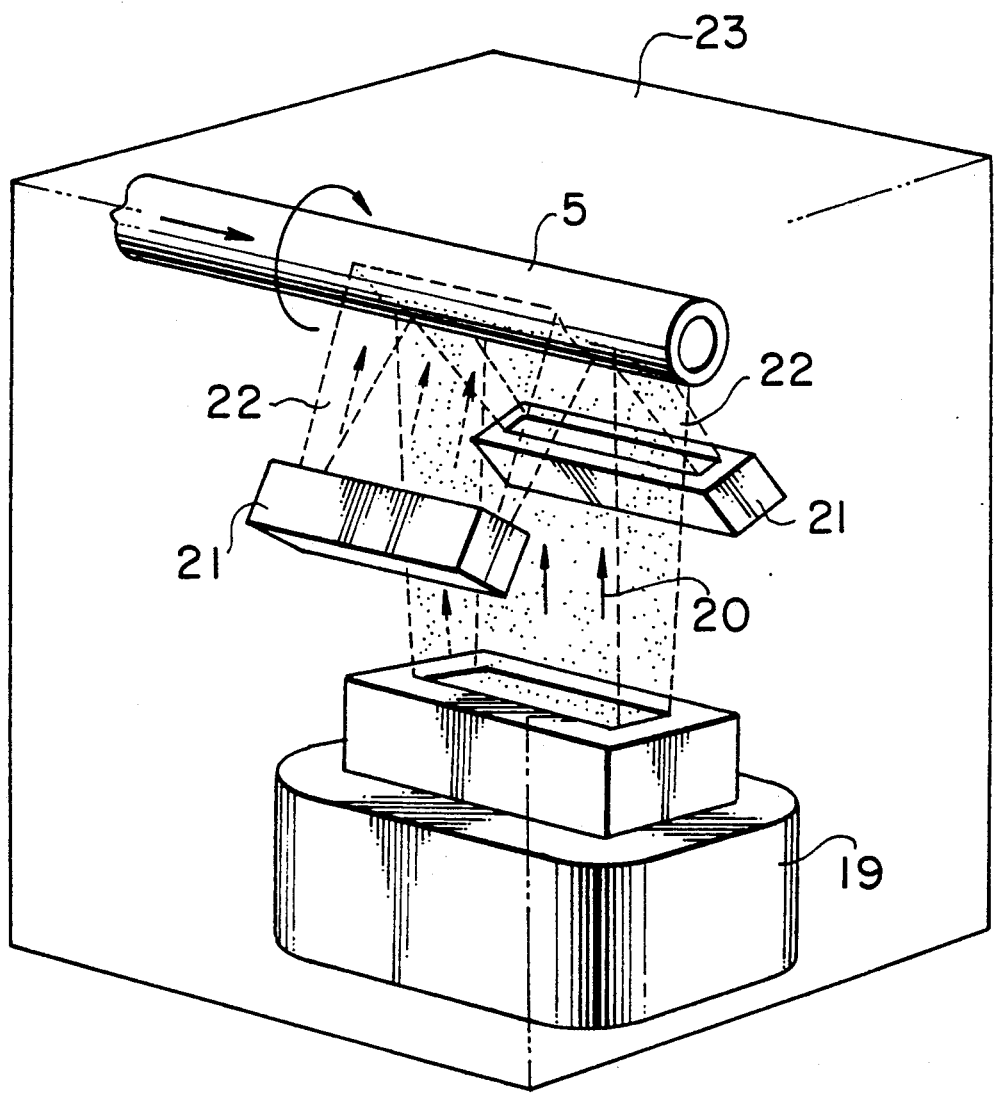
FIG. 6 is a schematic view which illustrates a method of forming a low tritium permeable layer basing upon a dynamic ion mixing method.

The low tritium permeable layer 9 was formed on the inner surface of the vacuum vessel 2 made of JIS SUS 304 stainless steel by the dynamic ion mixing method in which oxygen ions accelerated to 40 KeV were applied at an ion density of $6 \times 10^{17}$ piece/cm$^2$ sec with evaporating Al at $4 \times 10^{17}$ piece/cm$^2$ sec in vacuum. As a result, an Al$_2$O$_3$ film of the average thickness of 10 μm was obtained. The low tritium permeable layer 9 was applied to the outer surface of the cooling metal base 5 of the thickness of 2 mm and outer diameter of 15 mm and made of JIS SUS 304 stainless steel by using the dynamic ion mixing apparatus shown in FIG. 6. That is, nitrogen ion beams 20 emitted from an ion source 19 were applied with the central shaft of the cooling metal base 5 rotated around the axis and cooling metal base 5 moved in the axial direction. Simultaneously, evaporated aluminum corpuscles 22 were generated from a vacuum evaporation source 21 so as to be evaporated to the same region to which the ion beams are applied.

As described above, also according to this embodiment, the low tritium-permeable layer 9 is formed on the surface of the tubular cooling metal base 5 in such a manner that it is thermally shielded by the heat resistant member 10. Therefore, the temperature of it is maintained by refrigerant in the passage 12 at a low level similarly to the above-described embodiment. The penetration of tritium can be further effectively prevented. Furthermore, since the low tritium-permeable layer 9 is also formed on the cooling metal base 2 serving as the vacuum vessel 2, the tritium penetration can be similarly prevented.

Example 4

Figure 7:
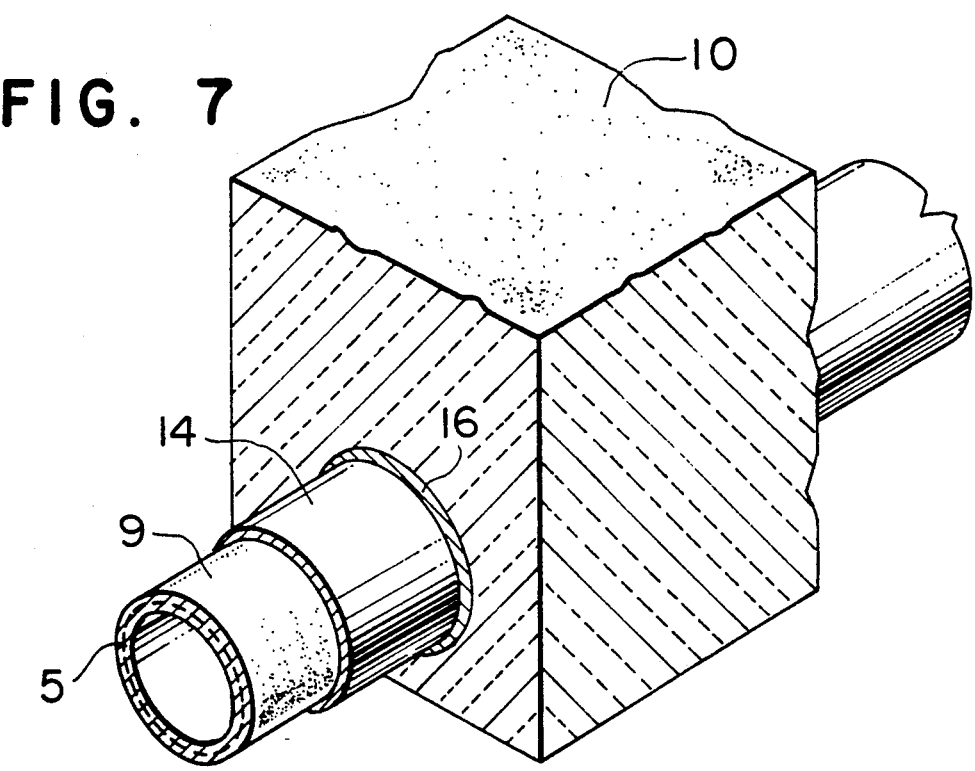
FIG. 7 is a perspective view which illustrates the detailed structure of the cooling metal base and heat resistant member according to another embodiment of the reactor core wall structure according to the present invention.

FIG. 7 is an embodiment in which the intermediate member 13 between the cooling metal base 5 and the heat resistant member 10 is excluded from the structure shown in FIG. 4. The structure of this type can be applied to a portion upon which the run away electrons are not made incident, for example to the heat receiving surface of a divertor device disposed away from the reactor core plasma.

In the vacuum vessel formed by charging mixed gas of heavy hydrogen methane (CD$_4$) and heavy hydrogen at about 10$^{-2}$ Torr in the cylindrical cooling metal base 5 of an outer diameter of 15 mm and made of Cu-Be alloy containing beryllium (Be) by at least 0.1%, high voltage was applied between the wall surface and the cooling metal base 5 so that a glow discharge was performed for one hour. As a result, 0.5 μm thick mixed film of BeO and hard carbon was formed on the surface of the cooling metal base 5. Then, a 0.5 μm thick nickel coating film was formed on the above-described mixed film of BeO and hard carbon by so-called an ion plating method in which a glow discharge of a rare gas is performed with performing nickel deposition. Then, the cooling metal base 5 double-coated with the low tritium permeable layer 9 made of the mixed film of BeO and hard carbon and the metal coating layer 14 made of nickel was inserted into a hole having an inner diameter of 15.1 mm formed in the heat resistant member 10 made of the carbon reinforcement carbon synthetic material so as to be brazed by using silver solder (28 wt % Cu, 5 wt % Ti, balance Ag) at the working temperature of 850° C. Also according to this embodiment, since the temperature of the low tritium-permeable layer 9 is maintained at a low level by the heat resistant member 10, the penetration of tritium into the refrigerant can be prevented.

Example 5

Figure 8:
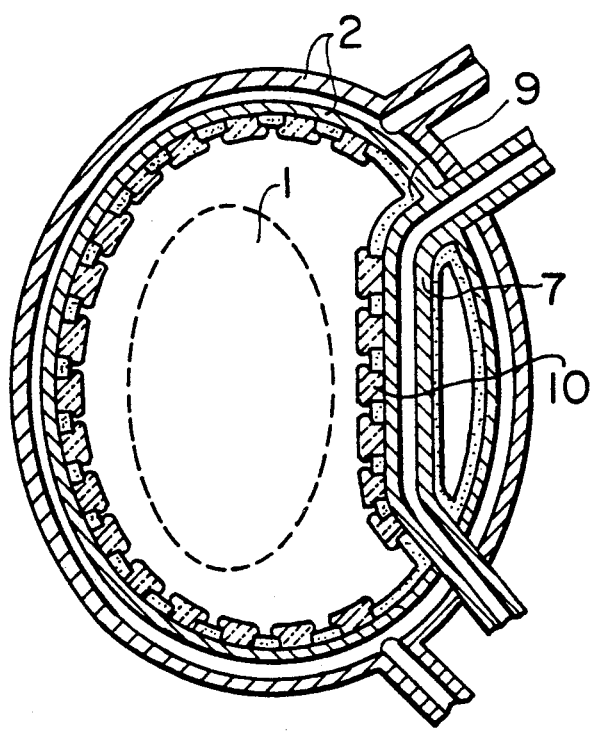
FIG. 8 is a halved cross sectional view which illustrates the reactor core portion according to the reactor core wall structure according to an embodiment of the present invention.

FIG. 8 is a vertical cross sectional view which schematically illustrates the reactor core wall structure of the nuclear fusion reactor according to another embodiment of the present invention. According to this embodiment, the sectioned heat resistant members 10 have a tritium permeable characteristic, the heat resistant members 10 being metallurgically or mechanically fastened to the inner surface of the vacuum vessel 2 or the surface of the cooling metal base 5 confronting the plasma. The low tritium-permeable layer 9 is formed in the portion of the surface of the inner surface of the vacuum vessel 2 and the surface of the cooling metal base 5 adjacent to the vacuum.

The low tritium-permeable layer is protected by the heat resistant member 10 from plasma corpuscles emitted from the reactor core plasma 1 or corpuscular rays made incident for the purpose of heating the plasma. Therefore, the low tritium-permeable layer can be protected from thermal, chemical or physical damage due to the incidental plasma corpuscles.

Example 6

Figure 9:
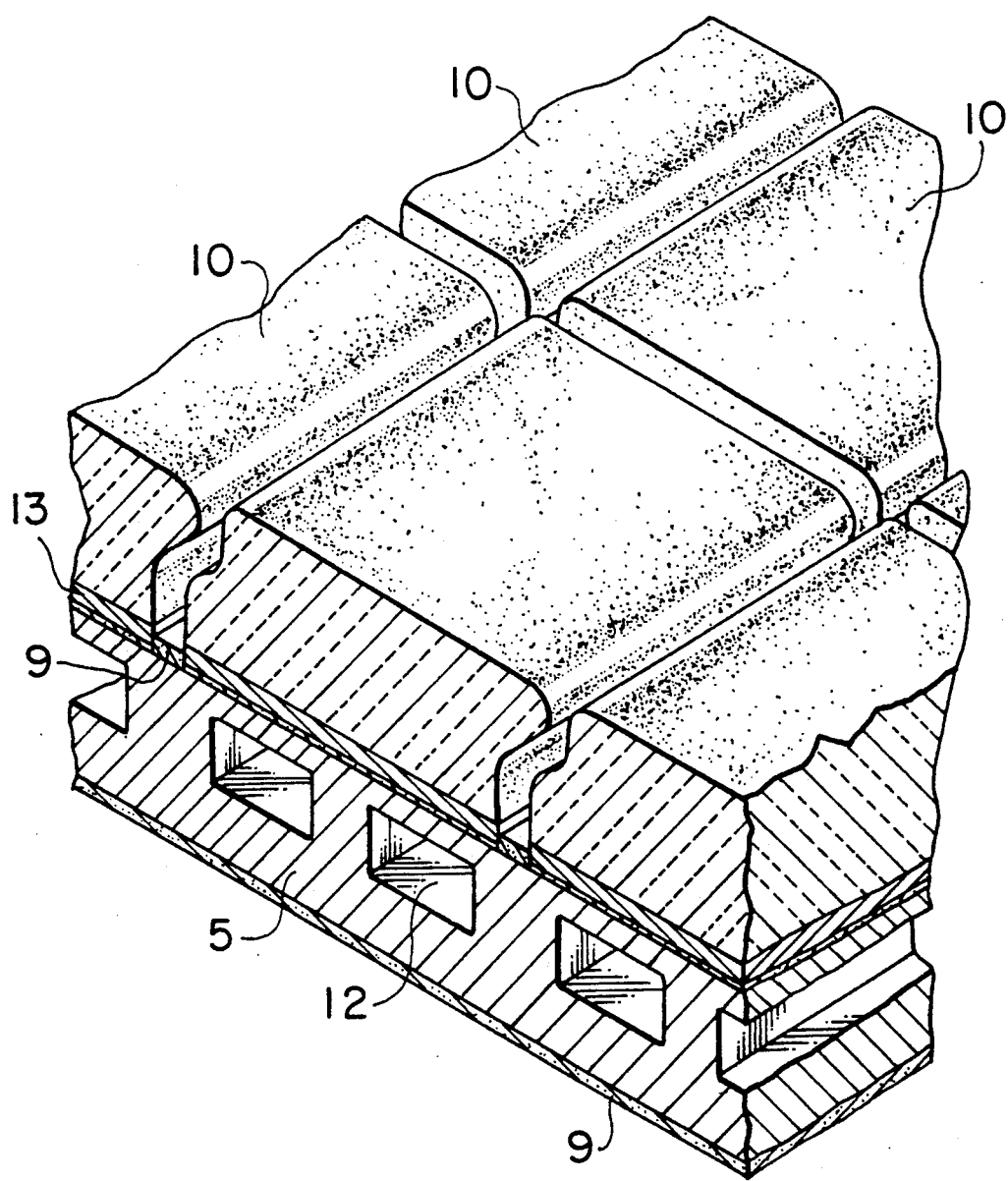
FIG. 9 is a detailed perspective view which illustrates an embodiment of the reactor core wall structure shown in FIG. 8.

FIG. 9 is a perspective view which illustrates another embodiment in which the reactor core wall structure shown in FIG. 8 is modified such that the low tritium-permeable layer 9 having the heat resistant member 10 is formed on the surface of the cooling metal base 5 covered with no heat resistant member 10.

The low tritium-permeable layer 9 made of titanium nitride (TiN) was formed by the dynamic ion beam mixing method on the portion of JIS SUS 304 stainless steel cooling metal base 5 having the cooling medium passages 12, the portion being hidden when viewed from the side of the reactor core plasma 1. That is, N+ ion beams accelerated by an accelerating voltage of 40 kV and at ion density of $3 \times 10^{17}$ piece/cm² sec were applied to the side of the 20 mm thick JIS SUS 304 stainless steel cooling metal base 5 having the cross sectional shape shown in FIG. 9 opposite to the side onto which the heat resistant member 10 is fastened, the application of N+ ion beams being performed with conducting titanium deposition at speed of $3 \times 10^{17}$ piece/cm² sec in an ambient of the degree of vacuum of $1 \times 10^{-4}$ Torr or less. As a result, a TiN film of the average thickness of 15 μm was obtained.

Then, a member formed by layering 50 μm thick brazing material consisting of 40 wt % Mn and the balance of copper on the both sides of the intermediate member 13 made of composite material of copper and carbon-fiber in the size of 50 mm × 50 mm × 2 mm was disposed on the surface of the cooling metal base 5 confronting the reactor core plasma. Then, the heat resistant member 10 made of SiC fiber reinforced SiC composite material containing SiC whisker by 10 wt % is placed so as to be applied with pressure and heat at 860° C. and 5 to 50 kg/cm² in an ambient of rare gas. Thus, the members were joined with one another. Bent steps are formed on the side portions of the heat resistant member 10 so that the adjacent heat resistant members can be overlapped by one another. As a result, the plasma corpuscles cannot directly hit the surface of the cooling metal base. In this case, it is preferable that the direction of the line of the magnetic force generated by the toroidal coil 3, the poloidal coil 4 and the plasma current in the vicinity of the wall surface be formed along the diagonal of the tiles of the heat resistant members 10. In addition, it is preferable that the direction of the movement of the ions of the components of the plasma coincide with the direction of the bending of the surface layer of the heat resistant member 10. As a result, the leaked out corpuscles from the plasma cannot easily be made incident upon the gaps among the heat resistant members 10, causing the surface of the cooling metal base 5 to be protected from the plasma corpuscles.

The low tritium-permeable layer 9 was formed on the cooling metal base 5 in the gap portions among the heat resistant member 10 by the ion beam sputtering method.

Example 7

Figure 10:
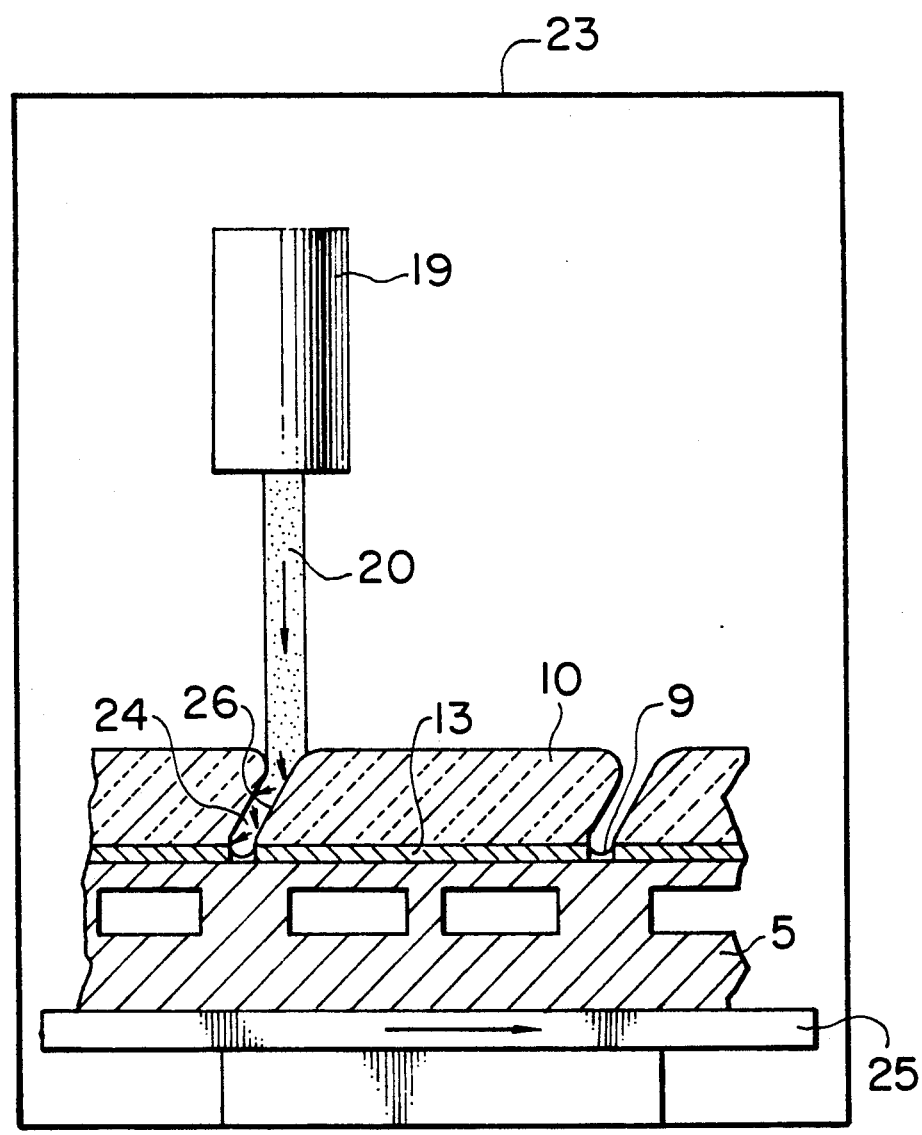
FIG. 10 is a perspective view which illustrates the structure of the reactor core wall with which the method of forming the low tritium permeable layer based upon the ion beam sputtering method is illustrated.

FIG. 10 describes a manner of forming the low tritium-permeable layer 9 in the gap portions among the heat resistant members 10 of the cooling metal base 5. The cooling metal base 5, to which the heat resistant member 10 has been previously mounted, is fastened on a feeding mechanism 25 in the vacuum vessel 23. Rare gas ion beams accelerated to 10 to 40 kV is issued from an ion source disposed above the cooling metal base 5 in vacuum so as to converged within the width of each of the gaps of the heat resistant members 10. The rare gas ion beams are made incident upon the gaps. Argon ions of energy of 30 kV is applied to the side surface of the heat resistant members 10 at an ion flux of $10^{17}$ piece/cm² sec so that SiC which is the component elements of the side surface was sputtered. Si and carbon atoms 24 of energy of several tens of electron volt sputtered from the side surface 26 of the heat resistant members 10 hit the surface of the cooling metal base 5 so that the surface coating layer is formed with heating the surface atoms. According to this sputtering method, a SiC film of 1 μm thick was formed in two minutes on the side surface of each of the intermediate members 13 and the surface of the cooling metal base 5 at a film-forming speed of 0.5 μm/minute.

A SiC film of 1.5 μm thick was formed on the surface of a 0.1 mm thick JIS SUS 304 stainless steel material by the ion beam sputtering method shown in FIG. 10. Then, the quantity of heavy hydrogen penetration was compared with the case in which no SiC sputtering-film was formed, resulting in the reduction in the quantity of the heavy hydrogen penetration by at least $10^{-4}$ at 600° C. as a result of the forming of the SiC sputtering-film.

As will be apparent from the above, according to the present invention, since the low tritium permeable layer can be protected by the heat resistant members from the heat load of the plasma or the corpuscular rays and the load of the corpuscular rays, the temperature of the low tritium-permeable layer can be significantly lowered during the operation. Therefore, the tritium penetration prevention effect can be improved by several to several tens times.

In the case where the heat load of the plasma or the corpuscular rays is high and it is directly introduced into the cooling metal base, the cooling metal base may fuse and/or the low tritium permeable layer may peel off due to thermal stress. According to the invention, however, the cooling metal base and low tritium-permeable layer formed on the cooling metal base can be protected from damage such as the fusion of the cooling metal base or peeling off of the low tritium permeable layer. Therefore, a low tritium-permeable reactor core wall structure exhibiting a significantly improved reliability can be realized. As a result, the quantity of tritium absorbed and dissolved in the cooling metal base and the wall of the vacuum vessel can be reduced. Consequently, a reactor core structure in which the quantity of tritium loss in the reactor core portion can be significantly reduced and the reliablity, maintenance facility, and safety are thereby significantly improved can be realized.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A nuclear fusion reactor having a vacuum vessel in which hydrogen isotope plasma or corpuscular rays is enclosed, a confining magnetic field generating coil for confining said plasma or corpuscular rays at a predetermined position in said vacuum vessel and a cooling metal base forming a wall of said vacuum vessel and having a refrigerant passage for cooling said wall, said nuclear fusion reactor also comprising:
   a layer with low tritium permeability, having lower tritium permeability than that of said cooling metal base and formed on the surface of said cooling metal base on at least a surface of said cooling metal base facing said plasma or corpuscular rays enclosed;
   a heat resistant and insulating fire member, with a heat resistance higher than that of said cooling metal base, for protecting and thermally shielding from irradiation of said plasma or corpuscular rays, said heat resistant and insulating fire member being formed overlying said surface of said cooling metal base facing said plasma or corpuscular rays, the heat resistant and insulator member being made of a fiber reinforced heat resistant member whose reinforcement fibers are made of a material selected from the group consisting of carbon, SiC, B and $B_4C$, and whose base material is made of a material selected from the group consisting of carbon, SiC, $B_4C$, $Be_2C$, $SiO_2$ and BeO.

2. A nuclear fusion reactor according to claim 1, wherein said heat resistant and insulating fire member is provided on said layer with low tritium permeability, said heat resistant and insulating fire member protecting and thermally shielding the layer with low tritium permeability from said irradiation.

3. A nuclear fusion reactor according to claim 1, wherein said layer with low tritium permeability is made of a material selected from the group consisting of C, Be, beryllium carbide, beryllium oxide, $B_4C$, aluminum oxide, aluminum nitride, silicon carbide, silicon oxide, silicon nitride, titanium oxide, titanium nitride, chromium oxide, chromium nitride, manganese oxide and zirconium oxide.

4. A nuclear fusion reactor having a vacuum vessel in which hydrogen isotope plasma or corpuscular rays is enclosed, a confining magnetic field generating coil for confining said plasma or corpuscular rays at a predetermined position in said vacuum vessel and a divertor disposed in said vacuum vessel and neutralizing ionized corpuscles so as to exhaust them, wherein said divertor comprises:
   a cooling metal base having a refrigerant passage for cooling the divertor;
   a layer with low tritium permeability, having lower tritium permeability than that of the cooling metal base, formed on at least a surface of said cooling metal base facing said plasma or corpuscular rays enclosed; and
   a heat resistant and insulating fire member, with a heat resistance higher than that of said cooling metal base, for protecting and thermally shielding from said irradiation of plasma or corpuscular rays, said heat resistant and insulating fire member being formed such that it covers said layer of low tritium permeability, the heat resistant and fire insulating member being made of a fiber reinforced heat resistant member whose reinforcement fibers are made of a material selected from the group consisting of carbon, SiC, B and $B_4C$, and whose base material is made of a material selected from the group consisting of carbon, SiC, $B_4C$, $Be_2C$, $SiO_2$ and BeO.

5. A nuclear fusion reactor according to claim 4, wherein said layer with low tritium permeability is made of a material selected from the group consisting of C, Be, beryllium carbide, beryllium oxide, $B_4C$, aluminum oxide, aluminum nitride, silicon carbide, silicon oxide, silicon nitride, titanium oxide, titanium nitride, chromium oxide, chromium nitride, manganese oxide and zirconium oxide.

6. A nuclear fusion reactor having a vacuum vessel in which hydrogen isotope plasma or corpuscular rays is enclosed, a confining magnetic field generating coil for confining said plasma or corpuscular rays at a predetermined position in said vacuum vessel, a first cooling metal base forming a wall of said vacuum vessel and having a refrigerant passage for cooling said wall, and a divertor disposed in said vacuum vessel and neutralizing ionized corpuscles so as to exhaust them, wherein said divertor comprises:
   a second cooling metal base having a refrigerant passage for cooling the divertor; and
   a heat resistant and insulating fire member, covering a surface of the second cooling metal base facing the plasma or corpuscular rays enclosed, with a heat resistance and fire insulation higher than that of said second cooling metal base, wherein said divertor is positioned in contact with said first cooling metal base forming a wall of said vacuum vessel and fixed where positioned, the heat resistant and fire insulating fire member being made of a fiber reinforced heat resistant member whose reinforcement fibers are made of a material selected from the group consisting of carbon, SiC, B and $B_4C$, and whose base material is made of a material selected from the group consisting of carbon, SiC, $B_4C$, $Be_2C$, $SiO_2$ and BeO.

7. A nuclear fusion reactor having a vacuum vessel in which hydrogen isotope plasma or corpuscular rays is enclosed, a confining magnetic field generating coil for confining said plasma or corpuscular rays at a predetermined position in said vacuum vessel, a first cooling metal base forming a wall of said vacuum vessel and having a refrigerant passage for cooling said wall, and a divertor disposed in said vacuum vessel and neutralizing ionized corpuscles so as to exhaust them, wherein said divertor comprises:

a second cooling metal base having a refrigerant passage for cooling the divertor;

a layer with low tritium permeability, having lower tritium permeability than that of said second cooling metal base, disposed on at least a surface of the second cooling metal base facing the plasma or corpuscular rays; and a heat resistant and insulating fire member, covering said second cooling metal base, with a heat resistance and fire insulation higher than that of said second cooling metal base, overlying the surface of the second cooling metal base facing the plasma or corpuscular rays, the heat resistant and insulating fire member being made of a fiber reinforced heat resistant member whose reinforcement fibers are made of a material selected from the group consisting of carbon, SiC, B and $B_4C$, and whose base material is made of a material selected from the group consisting of carbon, SiC, $B_4C$, $Be_2C$, $SiO_2$ and BeO;

and wherein said layer with low tritium permeability is also disposed on at least a surface of the first cooling metal base facing the plasma or corpuscular rays.

8. A nuclear fusion reactor according to claim 7, wherein the heat resistant and insulating fire member is on the layer with low tritium permeability disposed on the surface of the second cooling metal base facing the plasma or corpuscular rays.

9. A nuclear fusion reactor according to claim 7, wherein said layer with low tritium permeability is made of a material selected from the group consisting of C, Be, beryllium carbide, beryllium oxide, $B_4C$, aluminum oxide, aluminum nitride, silicon carbide, silicon oxide, silicon nitride, titanium oxide, titanium nitride, chromium oxide, chromium nitride, manganese oxide and zirconium oxide.

10. A nuclear fusion reactor having a vacuum vessel in which hydrogen isotope plasma or corpuscular rays is enclosed, a confining magnetic field generating coil for confining said plasma or corpuscular rays at a predetermined position in said vacuum vessel, a first cooling metal base forming a wall of the vacuum vessel and having a refrigerant passage for cooling said wall, a heat resistant and insulating fire member disposed overlying a surface of said first cooling metal base facing said plasma or corpuscular rays enclosed, with a heat resistance higher than that of said first cooling metal base, and a divertor disposed in said vacuum vessel and neutralizing ionized corpuscles so as to exhaust them, said divertor comprising:

a second cooling metal base having a refrigerant passage for cooling the divertor;

a layer with low tritium permeability, having lower tritium permeability than that of said cooling metal base, disposed on at least a surface of said second cooling metal base facing the plasma or corpuscular rays; and a heat resistant and insulating fire member, with a heat resistance and fire insulation higher than that of said second cooling metal base, covering the surface of the second cooling metal base facing the plasma or corpuscular rays, the heat resistant and insulating fire member being made of a fiber reinforced heat resistant member whose reinforcement fibers are made of a material selected from the group consisting of carbon, SiC, B and $B_4C$, and whose base material is made of a material selected from the group consisting of carbon, SiC, $B_4C$, $Be_2C$, $SiO_2$ and BeO;

and wherein said layer with low tritium permeability is also disposed on at least a surface of the first cooling metal base facing the plasma or corpuscular rays;

said divertor being positioned in contact with said first cooling metal base and being fixed in contact with said first cooling metal base.

11. A nuclear fusion reactor according to claim 10, wherein the heat resistant and insulating fire member is on the layer with low tritium permeability disposed on the surface of the second cooling metal base facing the plasma or corpuscular rays.

12. A nuclear fusion reaction according to claim 10, wherein said layer with low tritium permeability is made of a material selected from the group consisting of C, Be, beryllium carbide, beryllium oxide, $B_4C$, aluminum oxide, aluminum nitride, silicon carbide, silicon oxide, silicon nitride, titanium oxide, titanium nitride, chromium oxide, chromium nitride, manganese oxide and zirconium oxide.

13. A nuclear fusion reactor having a vacuum vessel in which hydrogen isotope plasma or corpuscular rays is enclosed, a confining magnetic field generating coil for confining said plasma or corpuscular rays at a predetermined position in said vacuum vessel, a first cooling metal base forming a wall of the vacuum vessel and having a refrigerant passage for cooling said wall, a first heat resistant and insulating fire member, disposed overlying a surface of said first cooling metal base facing said plasma or corpuscular rays enclosed, with a heat resistance higher than that of said first cooling metal base, and a divertor disposed in said vacuum vessel and neutralizing ionized corpuscles so as to exhaust them, said divertor comprising:

a second cooling metal base having a refrigerant passage for cooling the divertor;

a 0.1 $\mu m$ to 30 $\mu m$ thick layer having low tritium permeability, lower than that of said second cooling metal base, disposed on at least a surface of the second cooling metal base facing the plasma or corpuscular rays, said layer having low tritium permeability including at least one material having a tritium diffusion coefficient at 600° C. of $1 \times 10^{-9}$ cm/sec or less and selected from carbon, Be, a carbide and an oxide of Be, $B_4C$, an oxide and a nitride of Al, a carbide, an oxide and nitride of Si, an oxide and a nitride of Ti, an oxide and a nitride of Cr, an oxide of Mn and an oxide of Zr;

a second heat resistant and insulating fire member, covering said second cooling metal base, provided for said divertor, with a heat resistance and fire insulation higher than that of said second cooling metal base, said divertor being positioned in contact with said first cooling metal base for forming said refrigerant passage for cooling said vacuum vessel and being fixed in contact with said first cooling metal base;

and wherein said second heat resistant and insulating fire member is joined to the surface of said layer with low tritium permeability by a metal layer formed of at least one material selected from the group consisting of Be, carbon, Al, Ti, Cr, Ni, Fe, Cu, Ag, Au, Mo and W by using a brazing material, said heat resistant and insulating fire member being made of a fiber reinforced heat resistant member whose reinforcement fiber is at least one fiber selected from carbon fiber, SiC fiber, boron fiber and $B_4C$ fiber and whose base material is made of at least one material selected from the group consisting of carbon, SiC, Be, $B_4C$, $Be_2C$, $SiO_2$ and BeO and having a thermal impact coefficient of 20 kW/m, and said first and second cooling metal bases being made of non-magnetic austenitic alloy; and wherein said layer having low tritium permeability is also disposed on at least a surface of the first cooling metal base facing the plasma or corpuscular rays.

14. A divertor, adapted to be disposed in a torus vacuum vessel of a nuclear fusion reactor, neutralizing impurities contained in plasma or corpuscular rays in the vacuum vessel for exhausting the impurities out of the vacuum vessel, wherein said divertor comprises a cooling metal base having a refrigerant passage for cooling said divertor, a heat resistant and insulating fire member, with a heat resistance higher than that of said cooling metal base, which is formed on at least a surface of said cooling metal base facing said plasma or corpuscular rays enclosed so that it covers said cooling metal base, and a cooling pipe, having a refrigerant passage, which is disposed in the heat resistant and insulating fire member, and comprises a layer, with tritium permeability lower than that of the pipe, which is formed on the circumferential outer surface of the pipe, said heat resistant and insulating fire member being made of a fiber reinforced heat resistant member whose reinforcement fiber is at least one selected from the group consisting of carbon fiber, SiC fiber, boron fiber and $B_4C$ fiber and whose base material is at least one selected from the group consisting of carbon, SiC, Be, $B_4C$, $Be_5C$, $SiO_2$ and BeO.

15. A divertor according to claim 14, wherein said layer having low tritium permeability is made of material selected from the group consisting of C, Be, beryllium carbide, beryllium oxide, $B_4C$, aluminum oxide, aluminum nitride, silicon carbide, silicon oxide, silicon nitride, titanium oxide, titanium nitride, chromium oxide, chromium nitride, manganese oxide and zirconium oxide.

16. A wall of a torus vacuum vessel for a nuclear fusion reactor, comprising a cooling metal base having a refrigerant passage, a layer with tritium permeability lower than that of the cooling metal base formed on at least a surface of said cooling metal base facing plasma or corpuscular rays enclosed in the vacuum vessel, and a heat resistant and insulating fire member, with a heat resistance higher than that of said cooling metal base, which is formed on the layer with the tritium permeability lower than that of the cooling metal base and which protects and thermally shields the cooling metal base from irradiation of said plasma or corpuscular rays, said heat resistant and insulating fire member being made of a fiber reinforced heat resistant member whose reinforcement fiber is of at least one selected from the group consisting of carbon fiber, SiC fiber, boron fiber and $B_4C$ fiber and whose base material is of at least one selected from the group consisting of carbon, SiC, Be, $B_4C$, $Be_2C$, $SiO_2$ and BeO.

17. A wall of a torus vacuum vessel for a nuclear fusion reactor according to claim 16, wherein said layer with low tritium permeability is made of a material selected from the group consisting of C, Be, beryllium carbide, beryllium oxide, $B_4C$, aluminum oxide, aluminum nitride, silicon carbide, silicon oxide, silicon nitride, titanium oxide, titanium nitride, chromium oxide, chromium nitride, manganese oxide and zirconium oxide.

18. A vacuum vessel of a nuclear fusion reactor, in which hydrogen isotope plasma or corpuscular rays is enclosed, comprising:
   a cooling metal base forming a wall of the vacuum vessel and having a refrigerant passage for cooling said wall; and
   a heat resistant and insulating fire member, covering a surface of the cooling metal base facing the plasma or corpuscular rays, with a heat resistance and fire insulation higher than that of the cooling metal base, the heat resistant and insulating fire member being made of a fiber reinforced heat resistant material whose reinforcement fibers are made of a material selected from the group consisting of carbon, SiC, B and $B_4C$, and whose base material is selected from the group consisting of carbon, SiC, Be, $B_4C$, $Be_2C$, $SiO_2$ and BeO.

19. A wall of a torus vacuum vessel for a nuclear fusion reactor, comprising:
   a cooling metal base forming the wall of the vacuum vessel and having a refrigerant passage for cooling said wall;
   a layer of material of low tritium permeability, as compared to material of the cooling metal base, provided on a surface of the cooling metal base facing inside of the vacuum vessel;
   a metal coating layer formed on a surface of the layer of material of low tritium permeability farthest from the cooling metal base; and
   heat resistant and insulating fire members overlying a surface of the metal coating layer furthest from the layer of material of low tritium permeability; and
   an intermediate member, between the metal coating layer and the heat resistant and insulating fire members, by which the heat resistant and insulating fire members are brazed on the metal coating layer.

20. The wall according to claim 19, wherein the heat resistant and insulating fire members comprise a plurality of members spaced from each other.

21. The wall according to claim 20, wherein a space between adjacent heat resistant and insulating fire members is bent in shape so that the layer of material of low tritium permeability, not covered by the heat resistant and insulating fire members, is protected from the plasma or corpuscular rays.

22. The wall according to claim 20, wherein grooves are provided in the cooling metal base surface facing the inside of the vacuum vessel, and wherein a space between adjacent heat resistant and insulating fire members are provided over the grooves.

23. The wall according to claim 22, wherein the layer of low tritium permeability and the metal coating layer are provided in the grooves.

24. The wall according to claim 19, wherein the heat resistant and insulating fire members are made of a fiber reinforced material whose reinforcement fibers are made of a material selected from the group consisting of carbon, SiC, B and $B_4C$, and whose base material is selected from the group consisting of carbon, SiC, Be, $B_4C$, $Be_2C$, $SiO_2$ and BeO.

25. A wall of a torus vacuum vessel for a nuclear fusion reactor, comprising:
- a cooling metal base forming the wall of the vacuum vessel and having a refrigerant passage for cooling said wall;
- a layer of material of low tritium permeability, as compared to material of the cooling metal base, provided on a first part of a surface of the cooling metal base facing inside of the vacuum vessel;
- a metal coating layer on a second part of said surface of the cooling metal base, said second part being different from said first part; and
- heat resistant and insulating fire members covering the second part and not the first part of the surface of the cooling metal base, adjacent heat resistant and insulating fire members being spaced from each other such that the layer of material of low tritium permeability is provided in spaces between adjacent heat resistant and insulating fire members.

26. The wall according to claim 25, wherein said metal coating layer comprises an intermediate member having brazing material on both sides thereof.

27. The wall according to claim 25, wherein sides of adjacent heat resistant and insulating fire members have a cross-section of bent steps such that adjacent heat resistant and insulating fire members can overlap one another.

28. The wall according to claim 25, wherein the heat resistant and insulating fire members are made of a fiber reinforced material whose reinforcement fibers are made of a material selected from the group consisting of carbon, SiC, B and $B_4C$, and whose base material is selected from the group consisting of carbon, SiC, Be, $B_4C$, $Be_2C$, $SiO_2$ and BeO.

29. A nuclear fusion reactor having a vacuum vessel in which hydrogen isotope plasma or corpuscular rays is enclosed, the vacuum vessel including, as components thereof, wall structure and a divertor, comprising:
- a cooling metal base for forming a refrigerant passage for cooling components of the vacuum vessel; and
- a heat resistant and insulating fire member, with heat resistance higher than that of said cooling metal base, said heat resistant and insulating fire member covering said cooling metal base, the heat resistant and insulating fire member being made of a fiber-reinforced material whose reinforcement fibers are made of a material selected from the group consisting of carbon, SiC, B and $B_4C$, and whose base material is made of a material selected from the group consisting of carbon, SiC, Be, $B_4C$, $Be_2C$, $SiO_2$ and BeO.

30. A nuclear fusion reactor according to claim 29, further comprising a layer of a material having lower tritium permeability than that of the cooling metal base, separate from the heat resistant and insulating fire member, said layer being provided on a surface of the cooling metal base facing inside of the vacuum vessel.

31. A nuclear fusion reactor according to claim 30, wherein the layer of a material having lower tritium permeability is interposed between the cooling metal base and the heat resistant and insulating fire member, the heat resistant and insulating fire member protecting and thermally shielding said layer of a material having lower tritium permeability from the plasma or corpuscular rays.

32. A nuclear fusion reactor having a vacuum vessel in which hydrogen isotope plasma or corpuscular rays is enclosed, the vacuum vessel including, as components thereof, wall structure and a divertor, comprising:
- a cooling metal base for forming a refrigerant passage for cooling components of the vacuum vessel;
- a heat resistant and insulating fire member, with heat resistance higher than that of said cooling metal base, said heat resistant and insulating fire member covering said cooling metal base, the heat resistant and insulating fire member being made of a fiber-reinforced material;
- a layer of a material having lower tritium permeability than that of the cooling metal base, separate from the heat resistant and insulating fire member, said layer being provided on a surface of the cooling metal base facing inside of the vacuum vessel, wherein the layer of a material having lower tritium permeability is interposed between the cooling metal base and the heat resistant and insulating fire member, the heat resistant and insulating fire member protecting and thermally shielding said layer of a material having lower tritium permeability from the plasma or corpuscular rays; and
- a metal coating layer interposed between the layer of a material having lower tritium permeability and the heat resistant and insulating fire member.

* * * * *